(12) United States Patent
Leijen

(10) Patent No.: US 8,978,793 B2
(45) Date of Patent: Mar. 17, 2015

(54) DRIVE ASSEMBLY, CARRIAGE AND CONVEYOR AND METHOD

(75) Inventor: Kees Jan Leijen, Anna Paulowna (NL)

(73) Assignee: Yeti Developments B.V., Anna Paulowna (NL)

( * ) Notice: Subject to any disclaimer, the term of this patent is extended or adjusted under 35 U.S.C. 154(b) by 11 days.

(21) Appl. No.: 13/818,813

(22) PCT Filed: Aug. 24, 2011

(86) PCT No.: PCT/NL2011/050574
§ 371 (c)(1),
(2), (4) Date: Oct. 7, 2013

(87) PCT Pub. No.: WO2012/099457
PCT Pub. Date: Jul. 26, 2012

(65) Prior Publication Data
US 2014/0021019 A1    Jan. 23, 2014

(30) Foreign Application Priority Data
Aug. 23, 2010   (NL) .................................... 2005257

(51) Int. Cl.
| | | |
|---|---|---|
| B62D 57/02 | (2006.01) |
| B65G 23/24 | (2006.01) |
| B62D 57/032 | (2006.01) |
| E02F 9/04 | (2006.01) |
| F16H 25/02 | (2006.01) |
| B65G 23/00 | (2006.01) |
| F16H 1/28 | (2006.01) |

(52) U.S. Cl.
CPC .............. *B65G 23/24* (2013.01); *B62D 57/032* (2013.01); *E02F 9/04* (2013.01); *F16H 25/02* (2013.01); *B65G 23/00* (2013.01); *F16H 1/28* (2013.01)

USPC ...................................... 180/8.1; 305/1; 305/3

(58) Field of Classification Search
USPC ................ 198/778, 781.07; 180/7.2, 8.1, 8.6; 280/1.181, 28.5; 305/1, 2, 3
See application file for complete search history.

(56) References Cited

U.S. PATENT DOCUMENTS

| | | | |
|---|---|---|---|
| 1,267,033 A | 5/1918 | Wilson | |
| 1,287,086 A | 12/1918 | Olsen | |
| 2,491,064 A | 12/1949 | Urschel | |
| 3,135,345 A * | 6/1964 | Scruggs | 180/8.6 |
| 4,252,204 A | 2/1981 | Bishop | |
| 4,462,476 A | 7/1984 | Shkolnik | |
| 4,527,650 A * | 7/1985 | Bartholet | 180/8.6 |
| 4,997,971 A * | 3/1991 | Maeda et al. | 560/4 |
| 5,411,108 A * | 5/1995 | Lobachev et al. | 180/8.7 |
| 5,758,734 A * | 6/1998 | Hong et al. | 180/8.1 |
| 6,364,040 B1 * | 4/2002 | Klann | 180/8.1 |
| 6,520,272 B2 * | 2/2003 | Cho et al. | 180/8.1 |
| 6,805,504 B1 * | 10/2004 | Nisnevich | 400/283 |
| 7,644,788 B2 * | 1/2010 | Scheetz | 180/9.5 |
| 7,753,145 B2 * | 7/2010 | Hillis et al. | 180/8.1 |
| 8,019,472 B2 * | 9/2011 | Montero SanJuan et al. | 700/245 |
| 8,042,627 B2 * | 10/2011 | Yang et al. | 180/8.6 |

* cited by examiner

*Primary Examiner* — Douglas Hess
(74) *Attorney, Agent, or Firm* — The Webb Law Firm

(57) ABSTRACT

Disclosed is a drive assembly for providing a drive for a device, such as a vehicle or an advancing device such as a conveyor. The drive assembly includes a frame; a motor fixed relative to the frame for driving the drive assembly; at least two drive members providing a transmission interface between the drive assembly and a ground surface or a conveyor for driving; and at least one movement control assembly per drive member. The movement control assembly is coupled to the motor and at least one drive member, and provides movement control of the respective drive member relative to the frame.

22 Claims, 28 Drawing Sheets

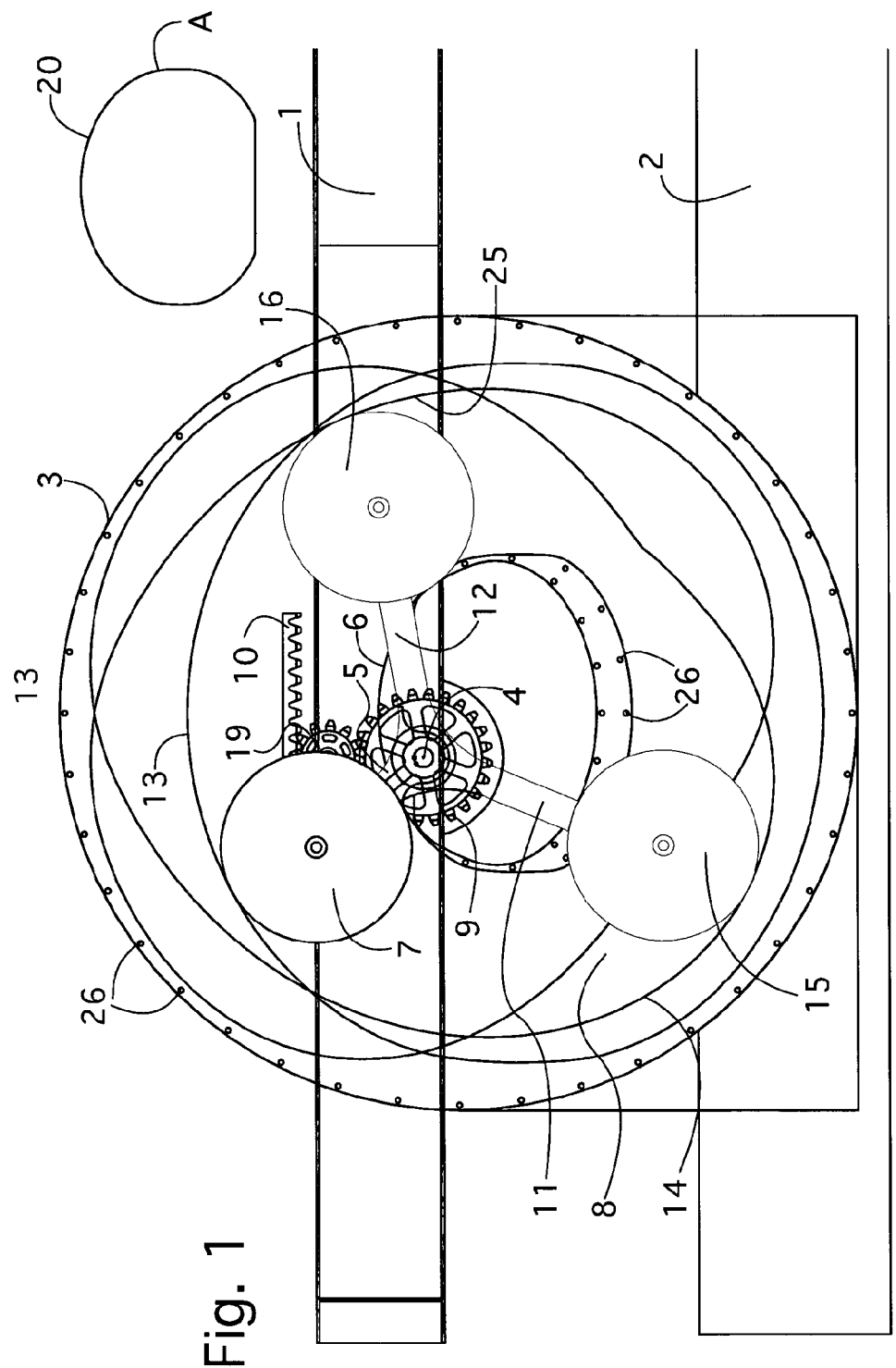

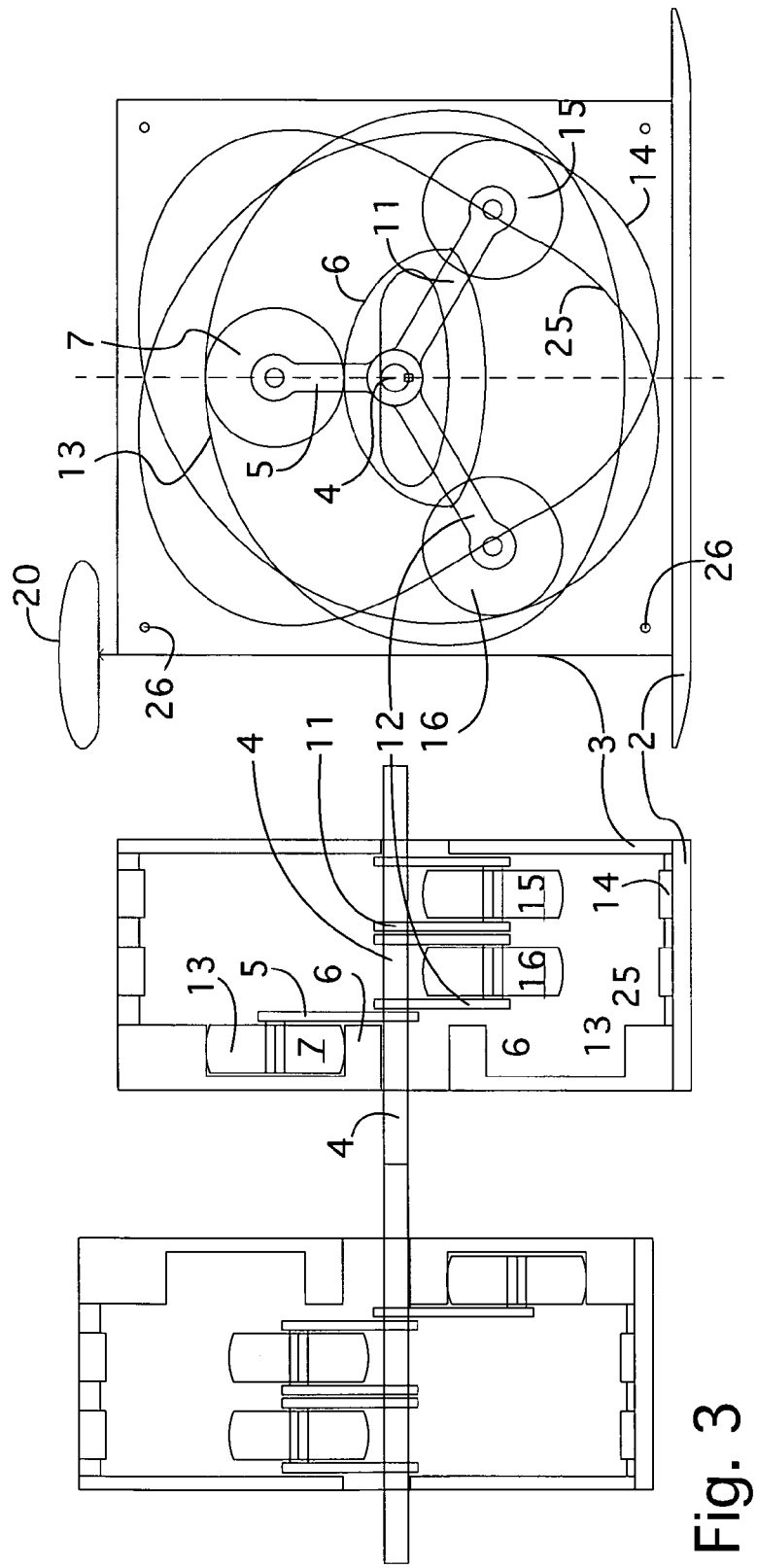

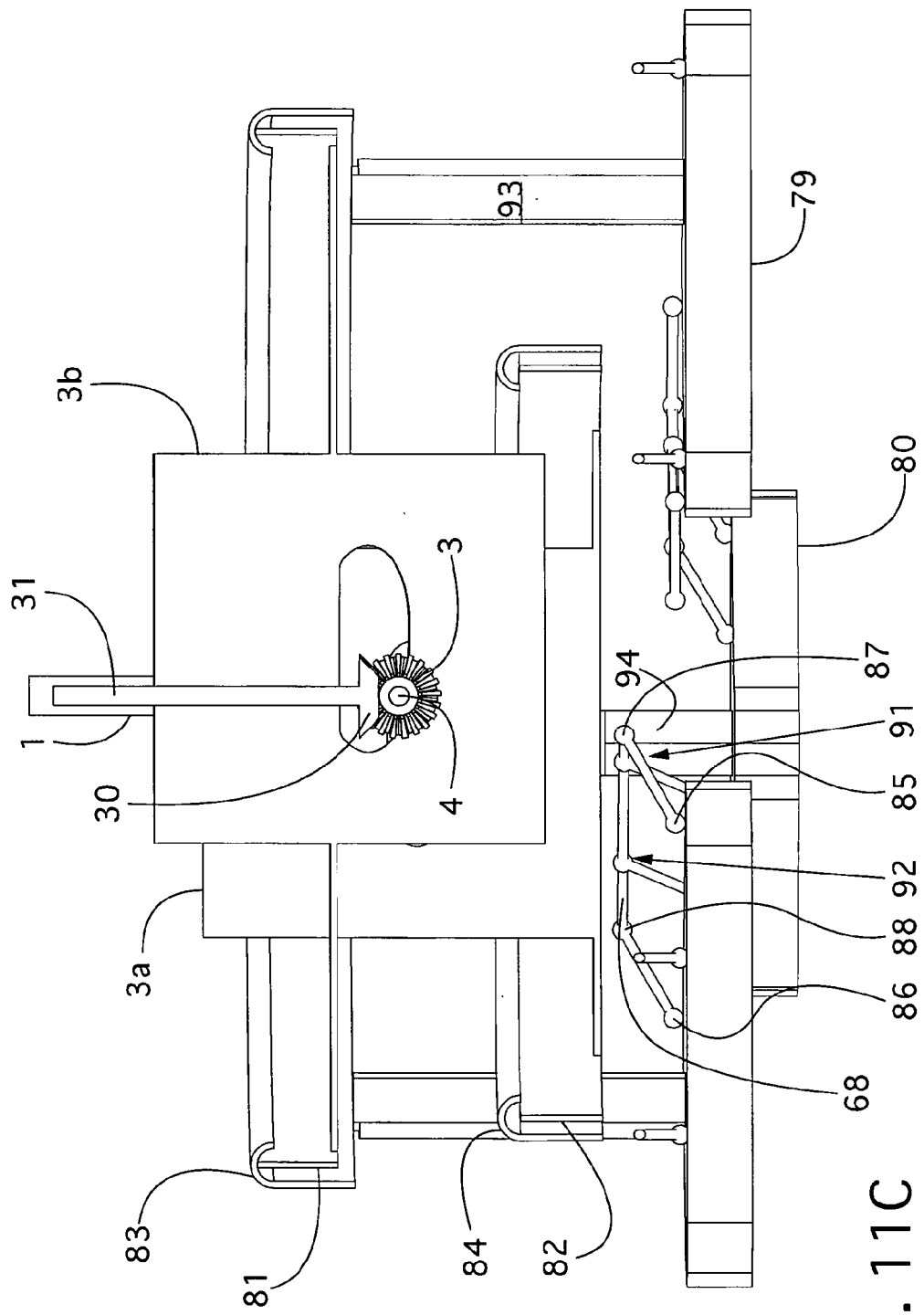

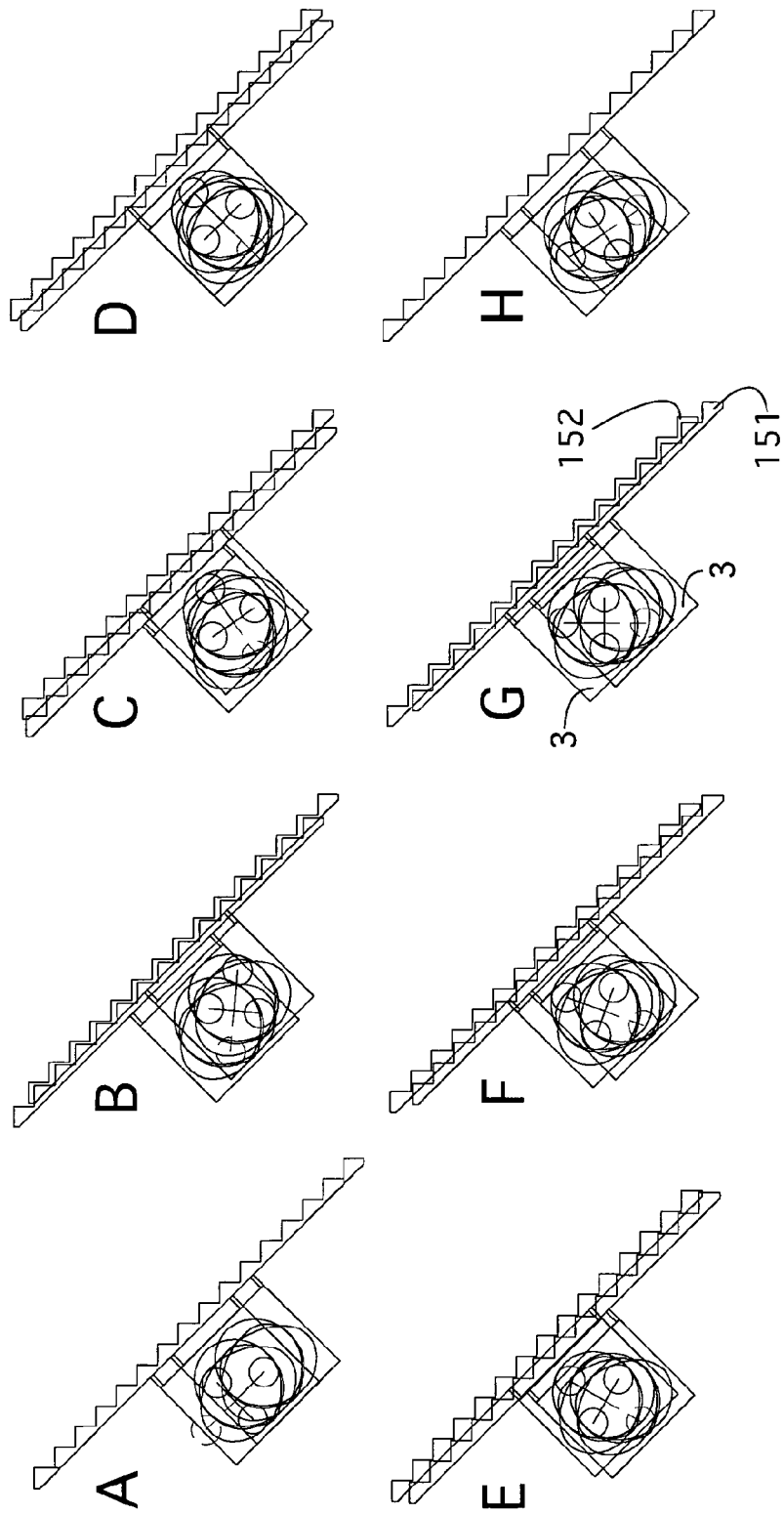

DRIVE ASSEMBLY, CARRIAGE AND
CONVEYOR AND METHOD

The present invention relates to a drive assembly for providing a drive suitable for application in a device such as a vehicle, or an advancing device such as a conveyor. The present invention also relates to a vehicle comprising such a drive assembly. The present invention also relates to an advancing device comprising such an assembly. The present invention further relates to a method for applying said aspects.

Vehicles have been known since the invention of the wheel. Using a wheel it is possible to displace a vehicle by means of the infinite repetition of the rolling of the wheel. An existing wheel has drawbacks, such as a limitation to the grip on the ground surface when it is slippery.

A solution for such drawbacks has been found according to the prior art by providing so-called caterpillar tracks. A caterpillar track has the advantage that the contact part with the ground or ground surface has a relatively large surface area compared to a round wheel. A greater traction can hereby be obtained in reliable manner. A caterpillar track does however have the drawback of being complex and requiring frequent maintenance. The contact surface consists generally of a large number of parts or segments which have to be attached to each other in mutually pivotable manner. A caterpillar track is hereby costly to manufacture and is vulnerable. A further drawback of a caterpillar track is that a ground surface can be damaged when a bend is negotiated.

For the purpose, among others, of obviating such drawbacks the present invention provides a drive assembly for providing a drive suitable for application in a device such as a vehicle, or an advancing device such as a conveyor, wherein the drive assembly comprises:
  a frame;
  a motor fixed relative to the frame for the purpose of driving the drive assembly;
  at least two drive members for providing a transmission interface between the drive assembly and a ground surface or a conveyor for driving;
  at least one movement control assembly per drive member, the movement control assembly being connected to the motor and at least one drive member, for providing a movement control of the respective drive member relative to the frame; wherein
  the movement control assembly is suitable for imparting a path of movement to a coupled drive member, the path of movement comprising a closed cycle, which closed cycle is a resultant of at least two guide tracks comprised by the movement control assembly,
  the path of movement comprises a drive path and a return path wherein the return path does not cross the drive path, and wherein:
  the drive members provide alternating drive contact.

An advantage of such a drive assembly according to the present invention is that for instance a vehicle can be provided which can be advanced in highly reliable and jolt-free manner using this drive. A further advantage is that such a drive assembly can be applied in for instance a transport system of a sewing machine. A drive assembly according to the present invention preferably provides for a uniform, linear drive.

An alternative possible application is the support of conveyor belts and simultaneous advancing thereof. Since the drive members according to the present invention can be applied to support a vehicle, they can also be applied to support the conveyor belt. A conveyor belt for moving discrete objects can be embodied with long, successively arranged drive members. Loose cargo and/or people can hereby be transported. A further application according to a further preferred embodiment is the application as escalator, as will be described in greater detail herein-below.

A further possible application is that of a transport floor in trucks. A further application is that of an advancing device, for instance for robots, such as a complex machine. A further field of application of such a drive assembly is for instance for a dredging platform which has to be displaced over the bed of a body of water such as a river or a lake or a sea. There are also many types of toys which have to be moved forward by means of an advancing device. Such types of toys usually have two, three, four or more legs which can be replaced by a drive assembly according to the present invention.

In a preferred embodiment according to the present invention the movement control assembly comprises at least three guide tracks for providing the path of movement in co-action with the respective guide arms fixed relative to each other, each preferably comprising a rotatable support element arranged between ends of the guide arms and the guide tracks.

By means of such a construction according to this preferred embodiment a jolt-free progress can be realized over an entire path of movement. This construction can also be manufactured fairly simply and advantageously due to the limited number of guide tracks.

In a further preferred embodiment the guide tracks are each formed by means of being cut out of a plate element, and an assembly of guide tracks is formed by means of respective plate elements fixed to each other, wherein the guide arms are fixed relative to each other such that each guide arm is oriented movably within substantially the plane of the plate element. The core of the movement control assembly can in this way be manufactured in simple manner. This construction is further highly durable because of the solid-state character of the block of guide tracks.

The drive member more preferably makes a substantially uniform linear movement along the drive path, the drive path being a resultant of the operation of the movement control assembly. In the case of for instance a vehicle the resultant of the guide tracks is a closed curve having a substantially straight side. The straight side is the part of the curve used for the forward movement.

The movement control assembly is more preferably fixed relative to the drive member. This enables a relatively advantageous construction method. Conversely, it is also possible for the motor to be fixed relative to the drive member and for the movement control assembly to be fixed to the frame.

The drive member preferably forms a drive foot for a vehicle. A vehicle is hereby realized which has the drive reliability of a drive assembly according to the present invention.

Alternatively the drive members provide a drive for a conveyor by means of alternating engagement on the conveyor. Examples hereof have already been stated in the foregoing.

In a further preferred embodiment the drive assembly comprises a drive gear rack in driving connection with a drive shaft of the motor, wherein the drive gear rack is preferably arranged mounted on the movement control assembly. Using such a drive gear rack a conventional forward driving force is provided for the purpose of providing a boost during for instance transport where gravitational force has to be overcome.

Provided in a further preferred embodiment is a transmission assembly for transmitting the path of movement from a movement control assembly at a position of a drive member to a further position of the drive member to which the movement control assembly is coupled and/or other drive members to which no movement control assembly is coupled. An advantage of such a preferred embodiment is that support of the drive member can be realized at multiple positions while fewer movement control assemblies are applied than support points. It is even possible for a larger number of drive members to be driven by means of for instance one or two movement control assemblies. In the case of a vehicle it is for instance possible to apply two movement control assemblies per pair of drive members; in other words, one movement control assembly per foot of the vehicle as minimum. It is further possible for further drive members to be coupled to these two movement control assemblies. This is further described hereinbelow with reference to a preferred embodiment.

The transmission assembly is more preferably provided with construction elements arranged in the form of a logical parallelogram, wherein the different construction elements arranged in the parallelogram form are mounted on the frame at locations realizing this form, and wherein the corner points of the parallelogram are provided with pivot points in a manner such that all mounting points of the parallelogram construction are held at the same angle to the frame in any orientation of the path of movement. Such an embodiment provides an advantageous and practical method for holding the drive members parallel to the frame. This is advantageous in a vehicle application as well as in a conveyor application.

In order to provide further advantages the mounting of the construction arranged in a parallelogram form is eccentric relative to the frame so that the drive path on a first side is relatively long and on the other side relatively short. It is hereby possible for instance with a relatively small modification of the construction to realize a greater step size. The forward movement can for instance hereby be performed more quickly. It is for instance also possible to apply a counterweight construction wherein the step size is relatively large and the opposite movement of the counterweight relatively small. A further advantage hereof is for instance a relatively small size of such a drive assembly under a vehicle.

In a further preferred embodiment the drive assembly according to the present invention comprises a steering device for changing the direction of the drive assembly. It hereby becomes possible for instance to provide a steerable vehicle.

Steering is preferably performed by means of steering frames for the purpose of thereby changing the angle of direction of the movement control assembly relative to the drive members and/or the frame. The movement control assemblies are preferably rotatable relative to the drive members and/or the frame, whereby they are independently rotatable for the purpose of changing the drive direction of the movement control assembly by providing this relative rotation by means of the steering frames. It is possible in this case to vary the direction of the drive member, whereby the vehicle follows a different direction when at least one drive member is clear of the ground surface.

The frame more preferably comprises two sub-frames rotatable relative to each other, which sub-frames are preferably circular in top view, more preferably arranged substantially coaxially and more preferably arranged axially relative to each other in the neutral position. This is particularly advantageous in the case of a vehicle of relatively short length relative to the width or a vehicle having the same length and width.

For vehicles of a relatively long length relative to the width, the frame preferably comprises means for rotating or pivoting a left-hand drive member and a right-hand drive member relative to each other. Steering of the vehicle is likewise provided here by means of providing a different direction in a subsequent step.

In the case of a steerable drive assembly, this latter preferably comprises a plurality of drive members, such as two drive members, more preferably four drive members and more preferably six drive members, wherein the drive members preferably have respectively a rod form, circular form, quadrant form or triangular form. The frames of the two drive members are mounted rotatably or pivotally relative to each other.

A rather different structure of the drive assembly is provided in the following preferred embodiment.

The drive assembly according to the invention more preferably comprises:
  a drive shaft drivable by the motor,
  a rotation drive member rotationally fixed to the drive shaft for driving the movement control assembly, which preferably functions as an eccentric,
  a support member connected by means of a bearing to the rotation drive member for supporting a drive member,
  a connecting member connected in bearing-mounted manner to the frame and the support member for imparting, together with the rotation drive member, a movement profile to the support member, wherein the mutual ratios of the distances between the connecting locations between respectively the frame, the rotation drive member, the support member and the connecting member provide a predetermined relative pattern of movement for the drive member.

A predetermined pattern of movement is hereby further provided in a simple manner.

In the drive assembly according to the invention the movement control assembly more preferably comprises:
  a drive shaft drivable by the motor;
  a rotation drive member rotationally fixed to the drive shaft for driving the movement control assembly, which preferably functions as an eccentric;
  a support member connected by means of a bearing to the rotation drive member for supporting a drive member;
  a connecting member connected in bearing-mounted manner to the frame and the support member for imparting, together with the rotation drive member, a movement profile to the support member, wherein the mutual ratios of the distances between the connecting locations between respectively the frame, the rotation drive member, the support member and the connecting member provide a predetermined relative pattern of movement for the drive member.

A further aspect according to the present invention relates to a vehicle comprising a drive assembly according to the present invention, comprising:
  coupling means for coupling the frame to a chassis and/or bodywork, wherein a number of drive members function as stepping members for the vehicle. Such a vehicle provides advantages as described in the foregoing with reference to the drive assembly and as will be set forth hereinbelow on the basis of a detailed description.

A second aspect according to the present invention relates to an advancing device such as a conveyor, comprising a drive assembly according to the present invention and comprising:
  coupling means for coupling the frame to a conveyor belt of the conveyor. This aspect also provides advantages as indicated in the foregoing with reference to the drive assembly.

A further aspect according to the present invention relates to a spiral conveyor comprising a drive assembly according to one or more of the foregoing claims 1-18 for cyclical movement relative to each other of two substantially spiral-shaped conveyor elements, each connected with a drive side to the drive assembly, wherein each spiral-shaped conveyor element comprises:

a substantially spiral-shaped carrier member for carrying product carriers;

product carriers extending relative to the carrier member in the position of use such that they can carry products, wherein:

the relative arrangement of the product carriers and the carrier members is such that a transport cycle relative to each other is possible with driving by the drive assembly for the purpose of providing an upward or downward transport along a substantially spiral-shaped path.

It becomes possible by means of such a conveyor to provide a uniform upward or downward movement by means of applying a drive assembly according to other preferred embodiments of the present invention. A significant advantage of this preferred embodiment is that, apart from the movement control assembly, it can be manufactured from solid-state components. The only required components that move relative to each other are comprised in the movement control assembly.

Due to the absence of the moving parts in the transport part of the conveyor, this conveyor according to the present invention has significant advantages in environments with for instance high temperatures or heavy chemical conditions, such as in for instance ovens, freezing tunnels, acid baths and zinc baths. Apart from the movement control assembly, such a conveyor does not require any maintenance. There is for instance the advantage that, if such a conveyor is applied in environments with high hygienic standards, possible cleaning can be realized very easily be due to the mutual fixation of components. Prior art conveyors have many components which can become fouled and can be cleaned only with very complex methods.

A further aspect according to the present invention relates to a method for providing a forward movement using a device according to the present invention, comprising steps for:

providing the device;

providing the forward movement by means of the device.

This aspect according to the present invention also provides advantages as indicated in the foregoing with reference to the drive assembly also applied in this aspect.

Further advantages, features and details of the present invention will be described in greater detail hereinbelow on the basis of one or more preferred embodiments with reference to the accompanying figures.

FIG. 1 shows a schematic cut-away side view of a detail of a first preferred embodiment according to the present invention.

FIG. 2 shows a schematic cut-away side view of a detail of a second preferred embodiment according to the present invention.

FIG. 3 shows a schematic cut-away front view of a detail of the preferred embodiment of FIG. 2.

FIG. 4A-F show different views of a further preferred embodiment according to the present invention.

FIG. 5A-C show schematic representations of a further preferred embodiment in different views.

Figure 5:
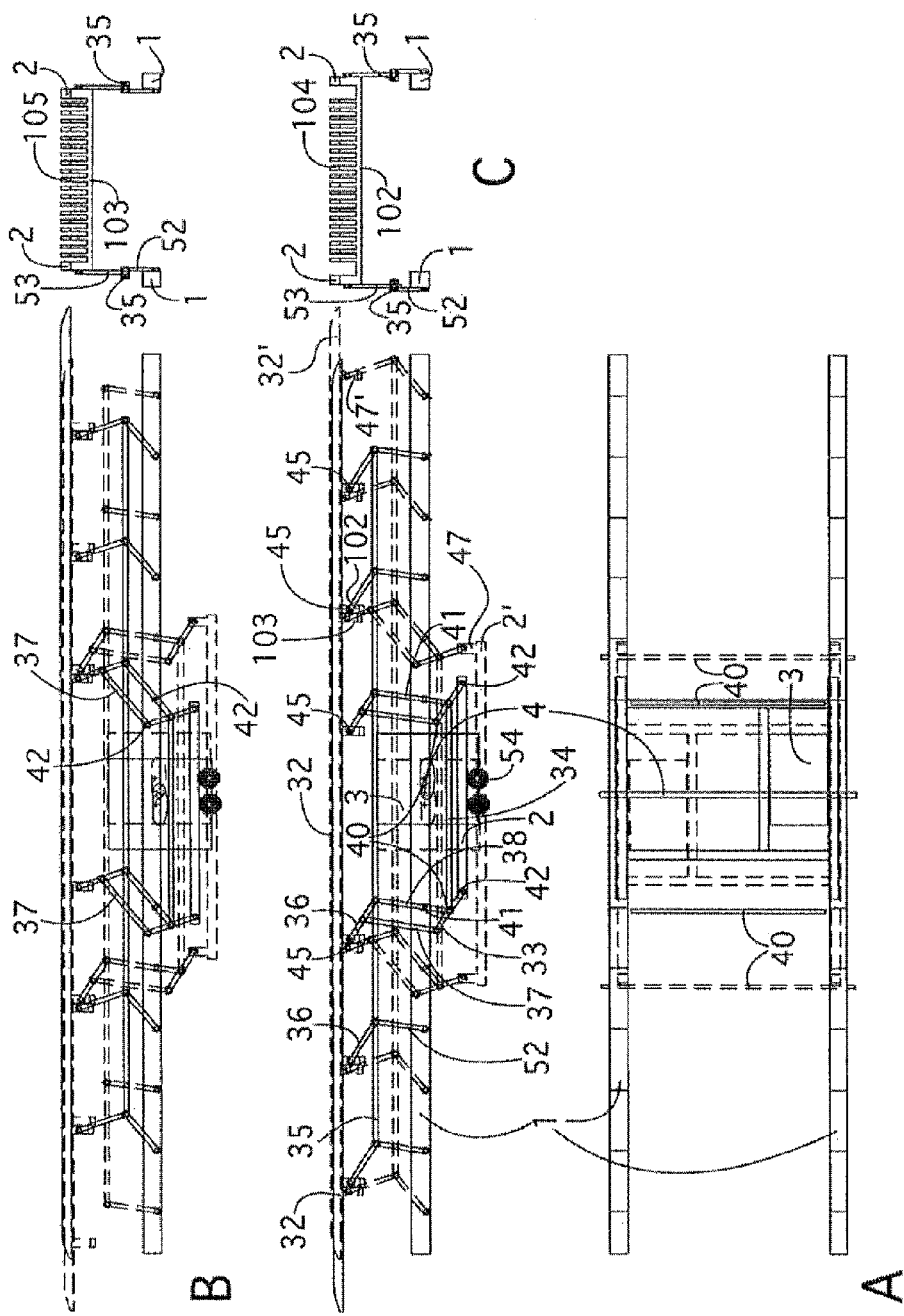
Figure 6:
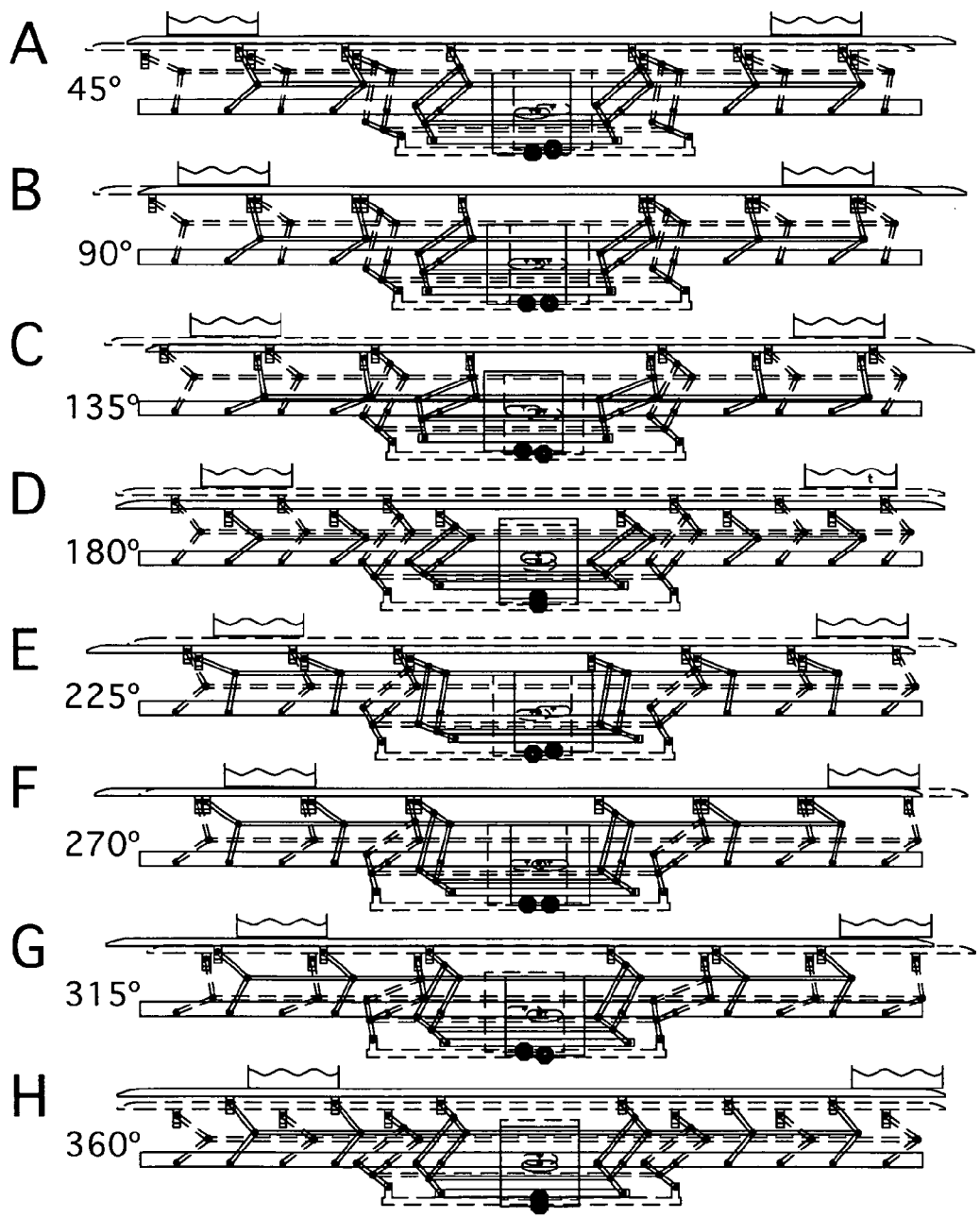

FIG. 6 shows a schematic side view of the preferred embodiment according to FIG. 5 in eight different positions of an operational cycle.

Figure 7:
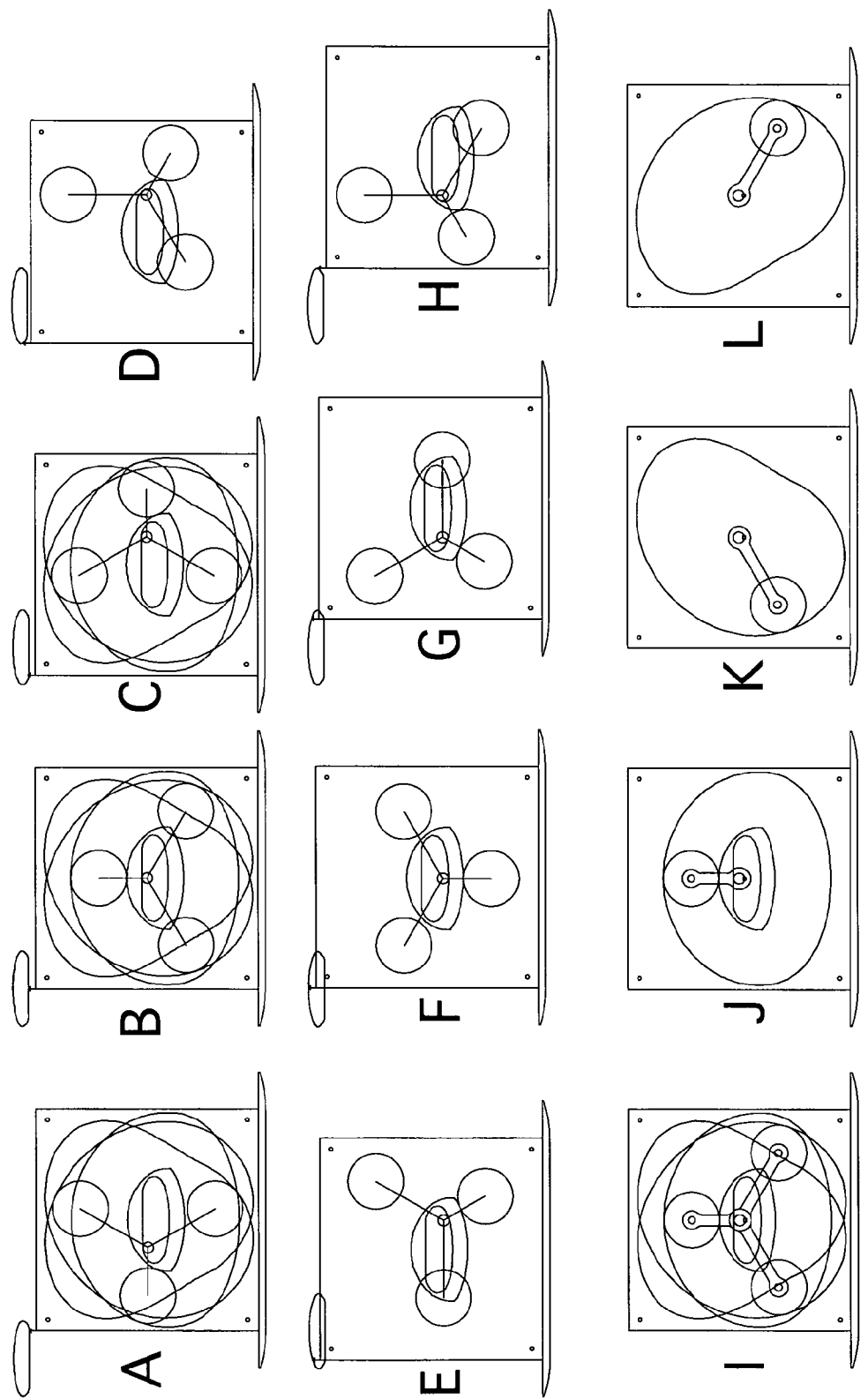

FIG. 7 shows twelve schematic views of different operating positions of a further preferred embodiment.

Figure 8:
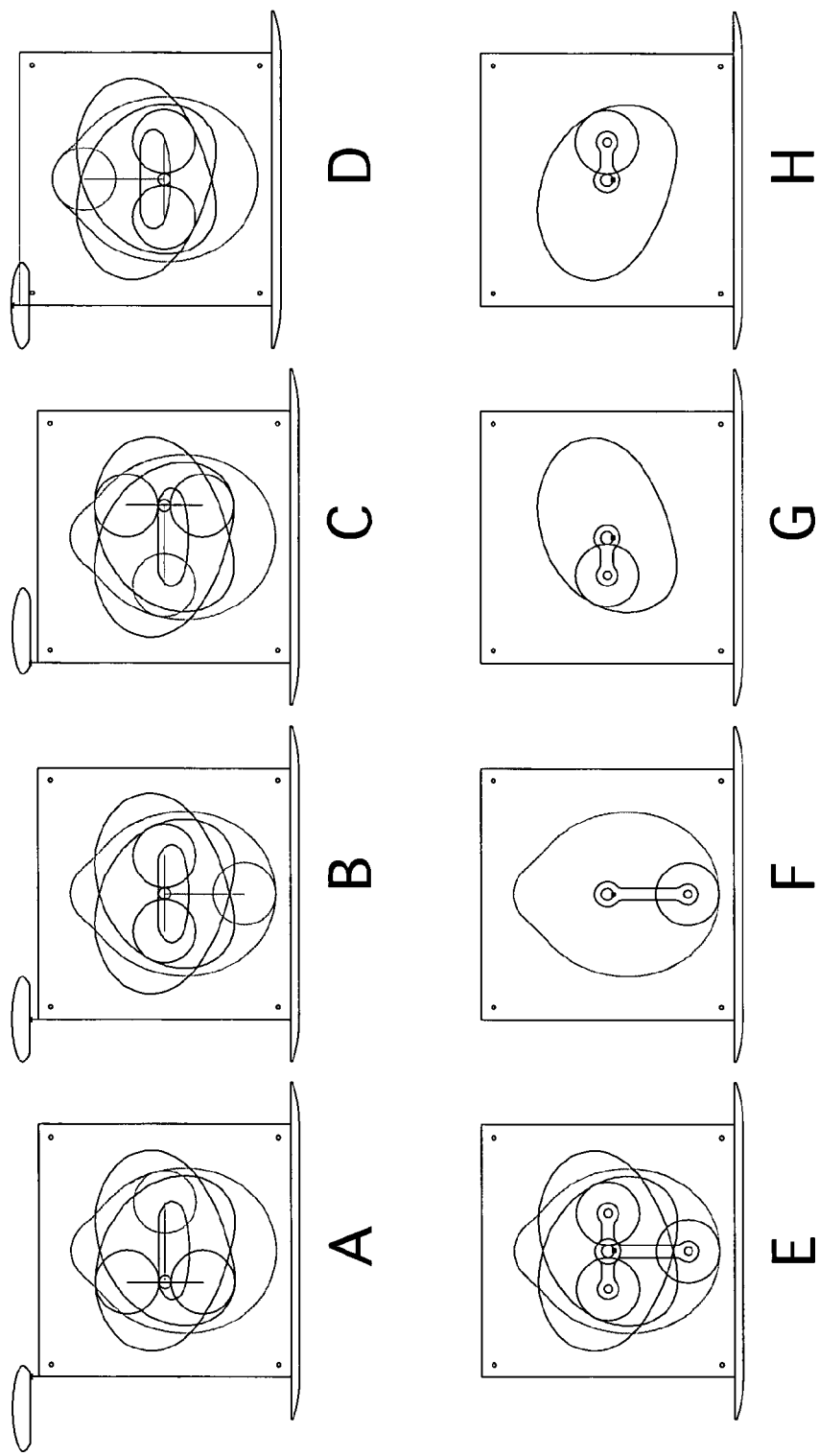

FIG. 8 shows eight schematic views of different operating positions of a further preferred embodiment.

Figure 9:
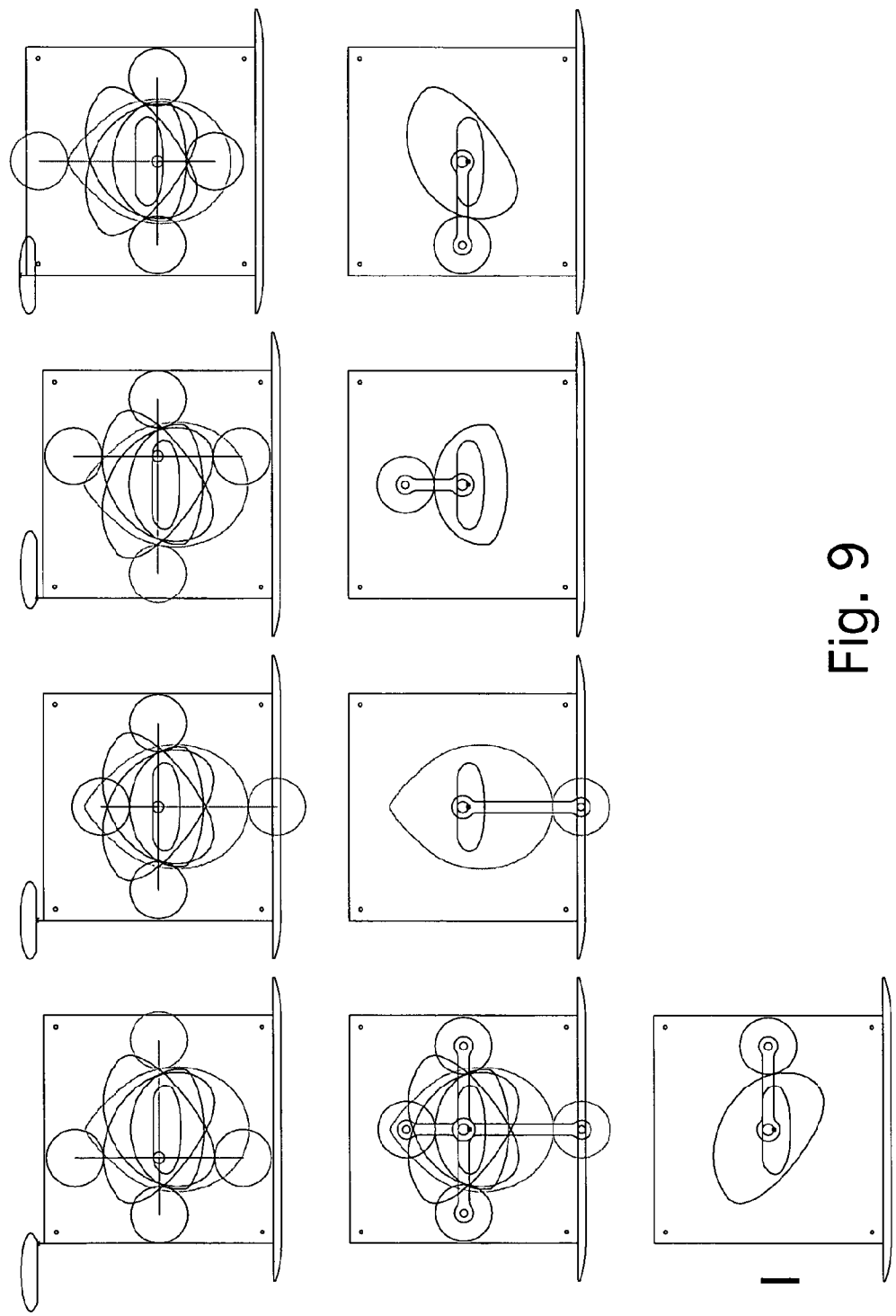

FIG. 9 shows nine schematic views of different operating positions of a further preferred embodiment.

Figure 10:
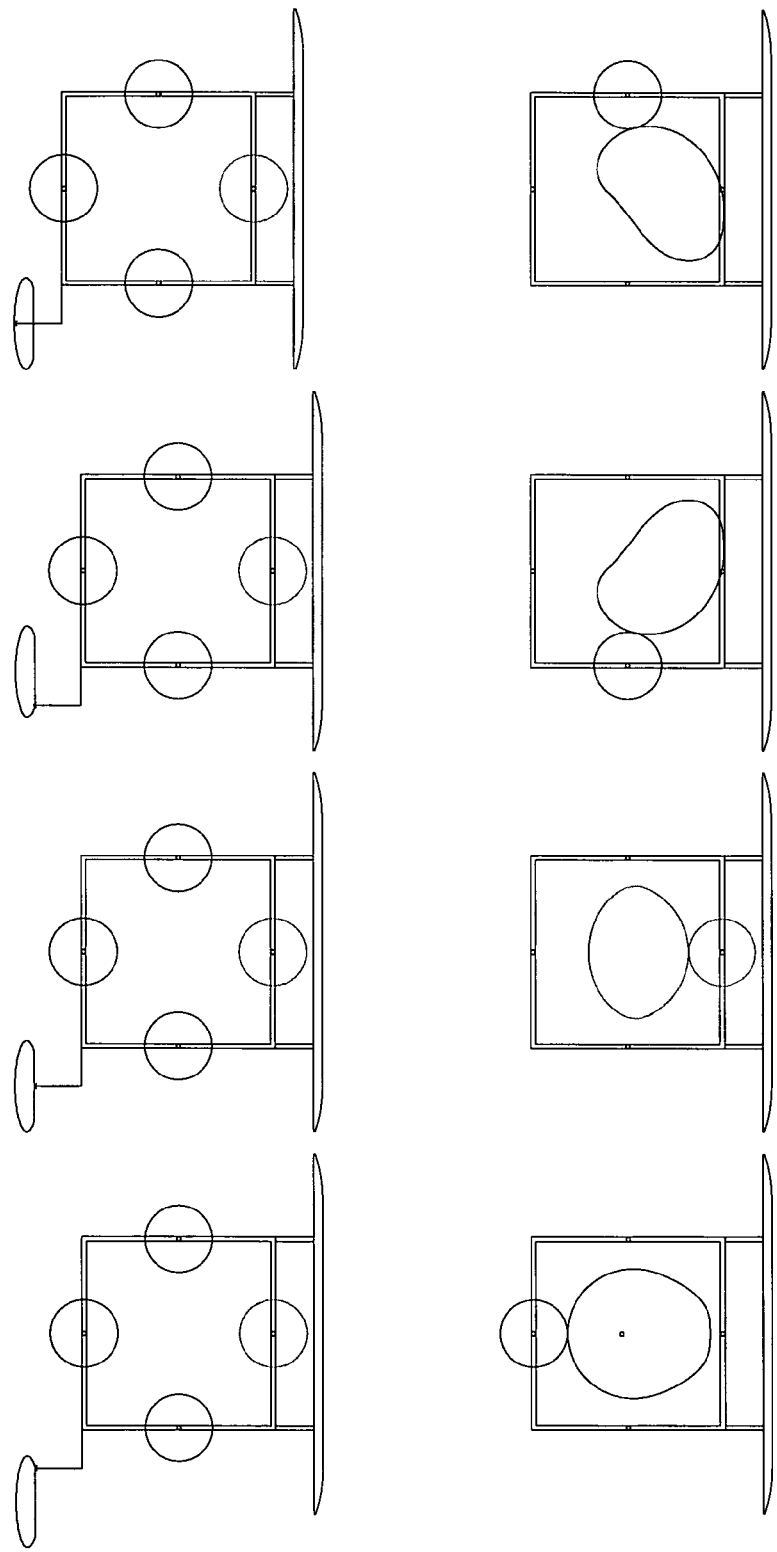
Figure 11A:
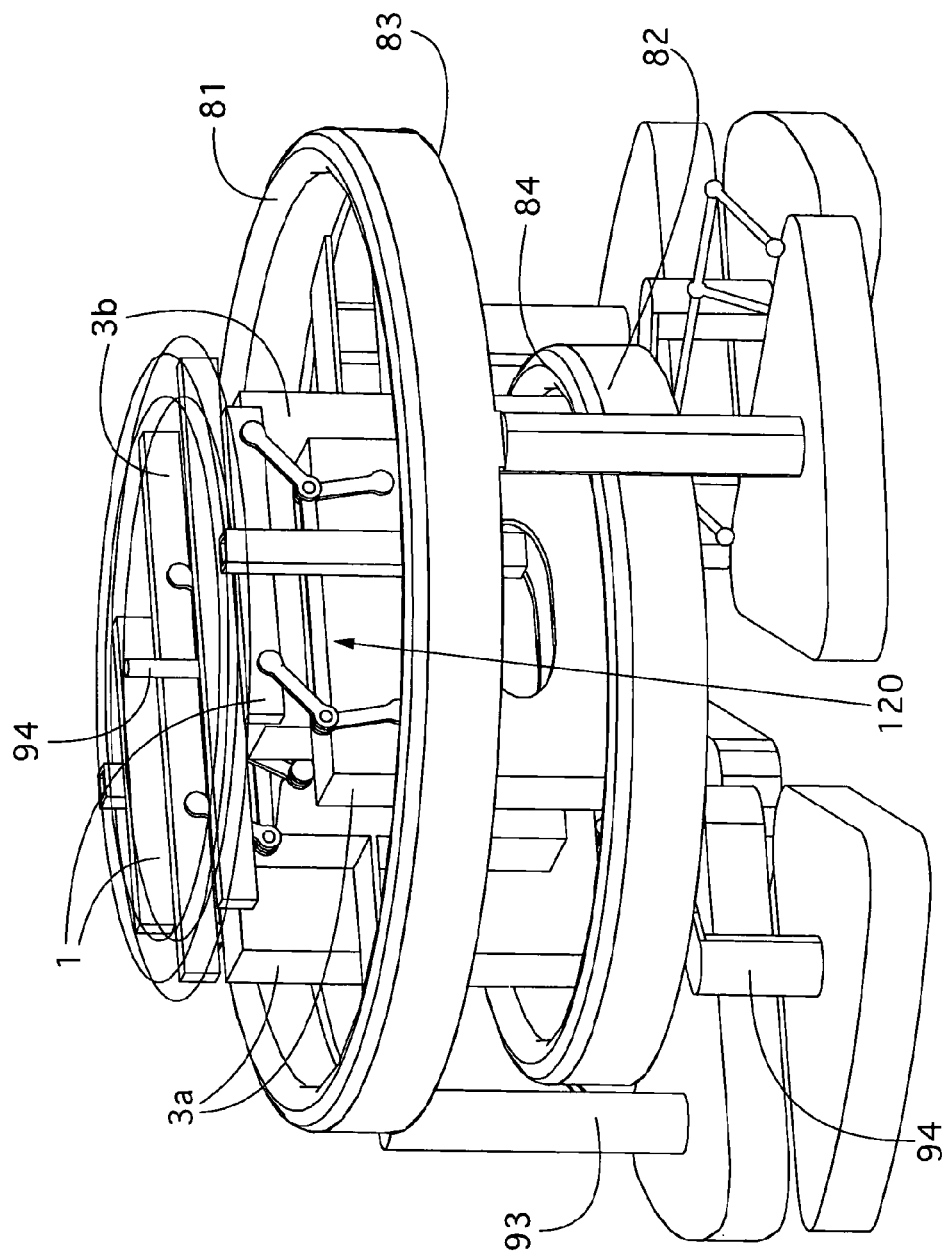
Figure 11B:
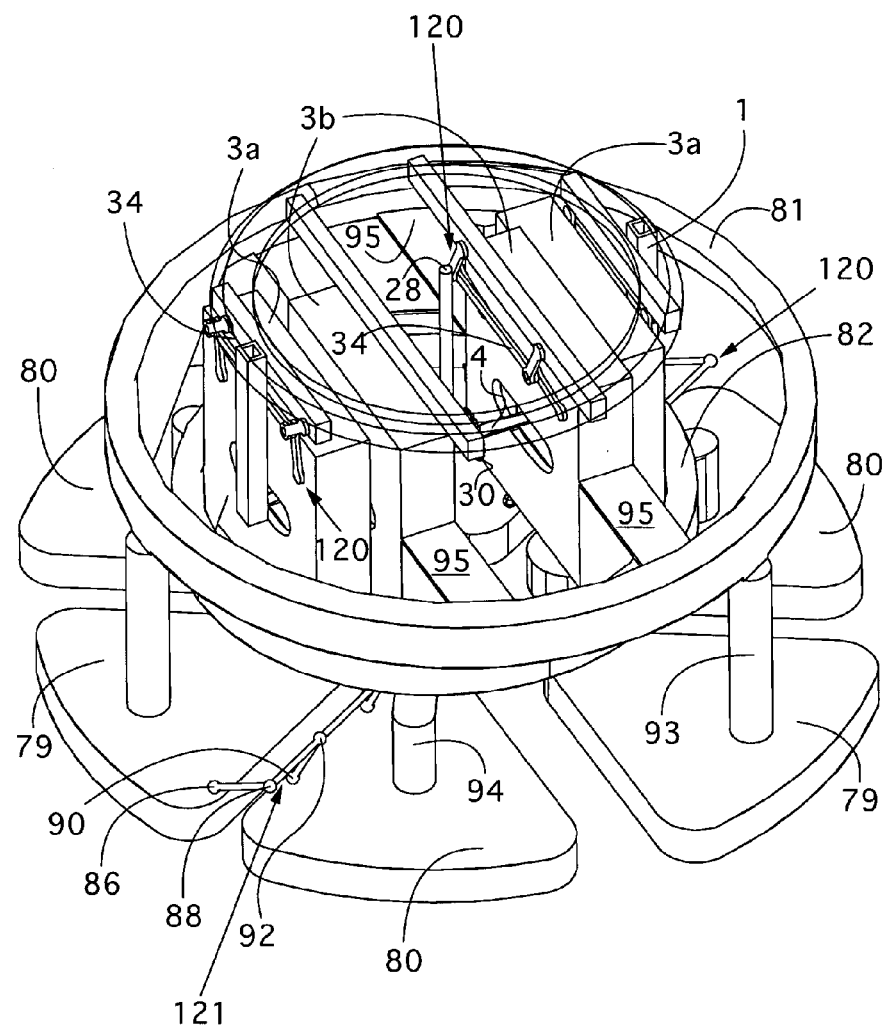
Figure 11D:
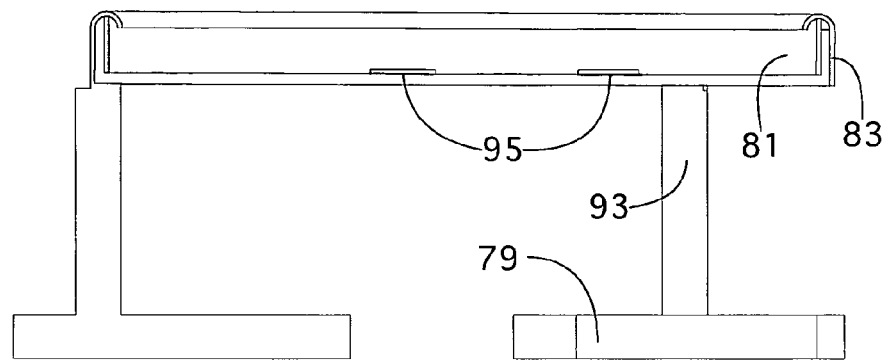
Figure 11E:
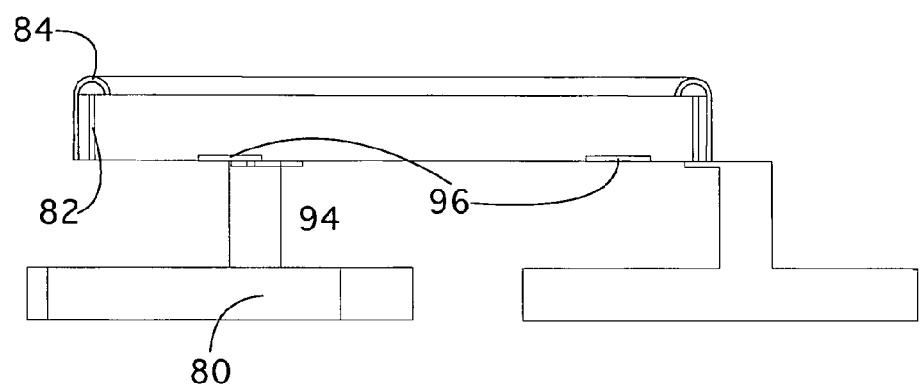
Figure 11F:
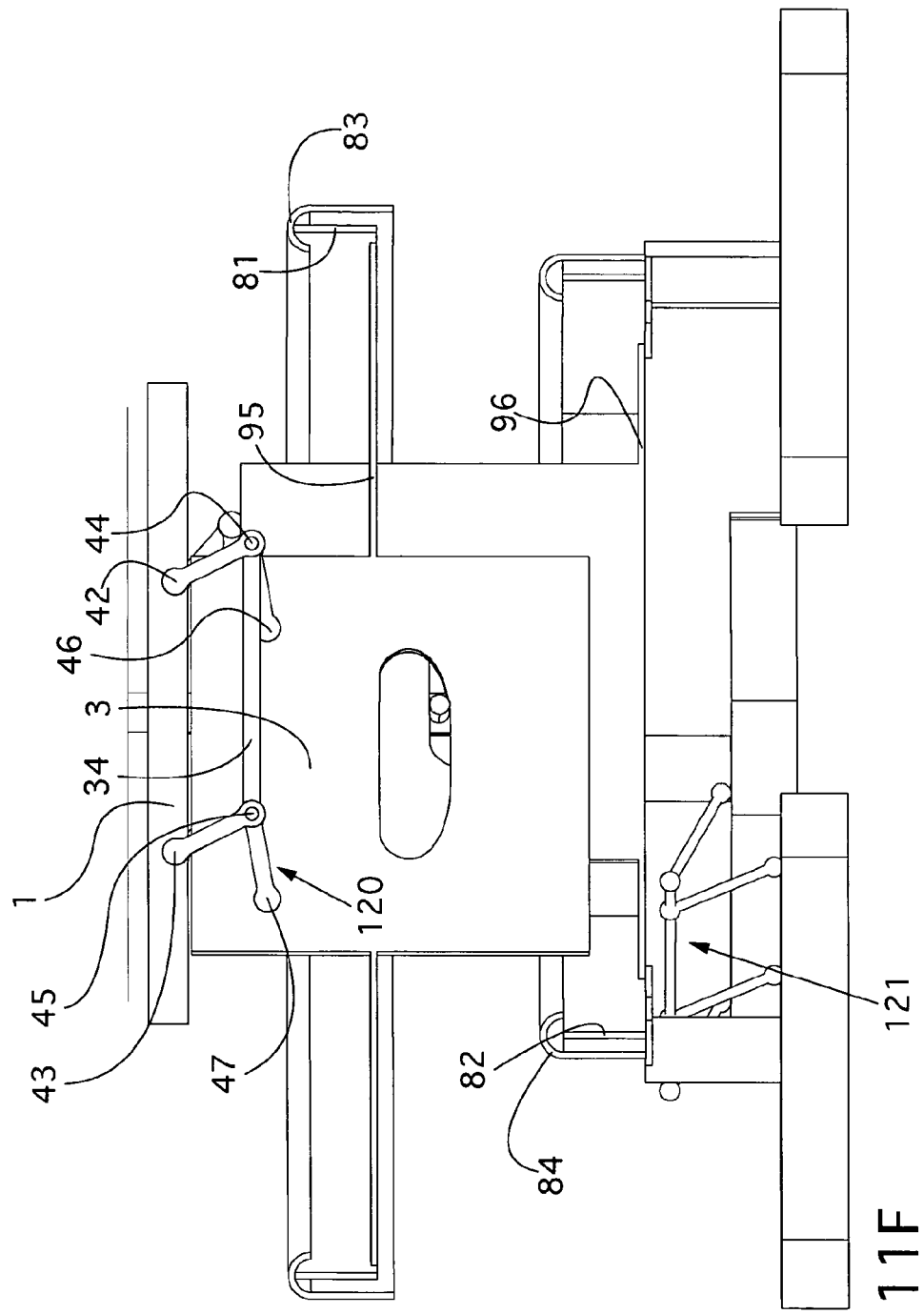
Figure 11G:
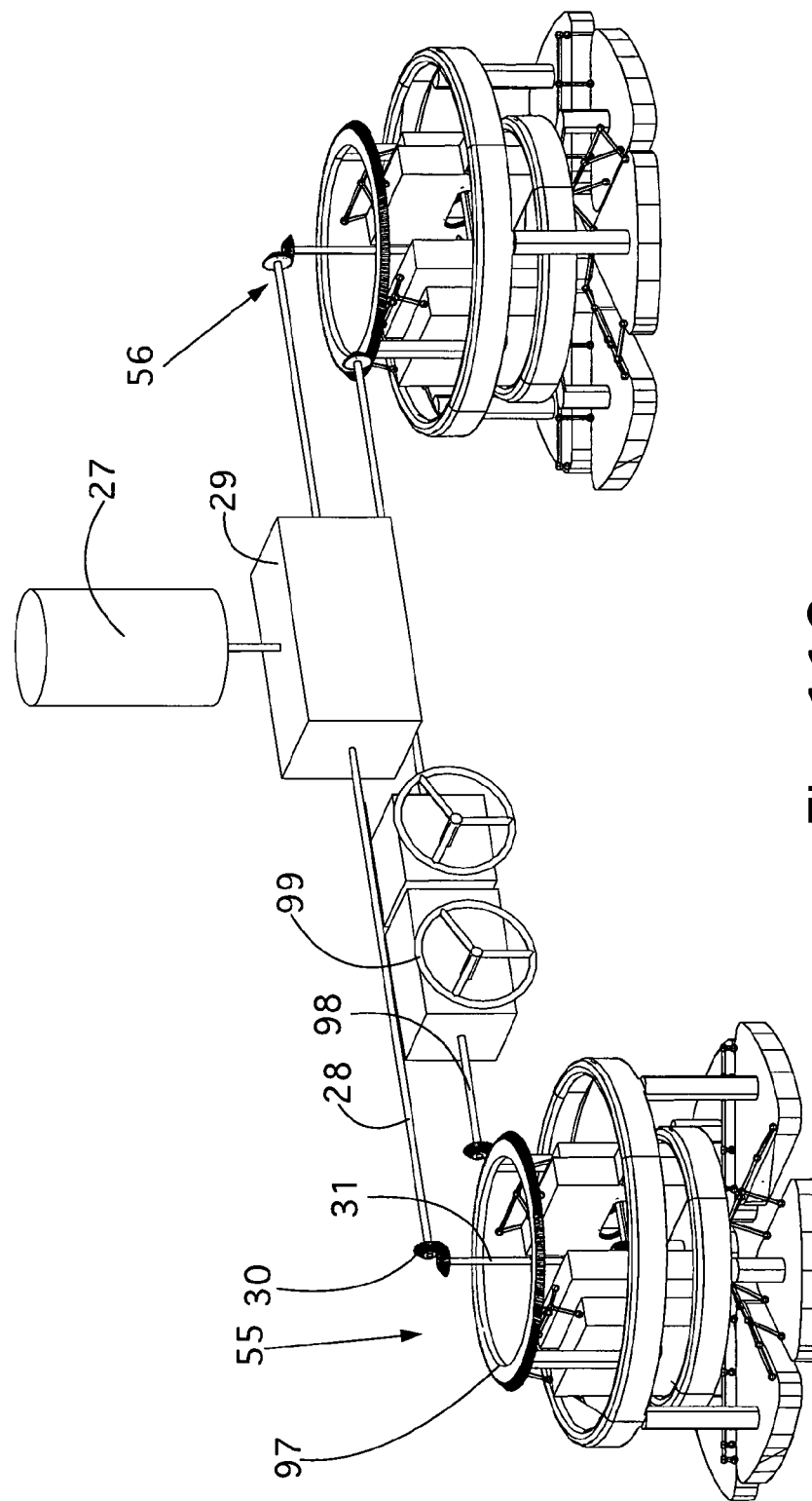

FIG. 10 shows eight schematic views of different operating positions of a further preferred embodiment.

FIG. 11A-G show side views of two schematic representations of a further preferred embodiment according to the present invention.

Figure 12:
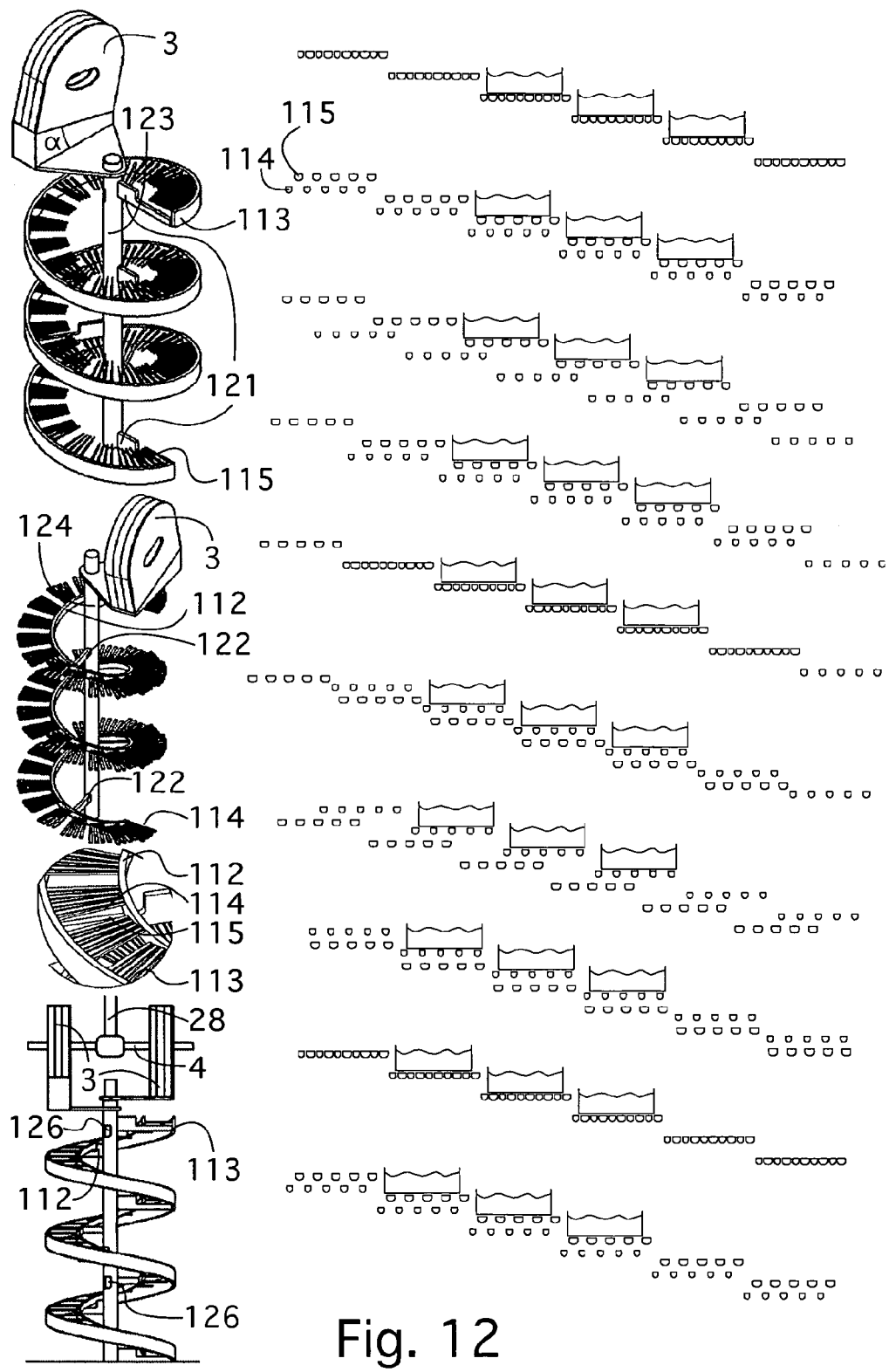

FIG. 12 shows perspective and cross-sectional views of a further preferred embodiment according to the present invention.

Figure 13:
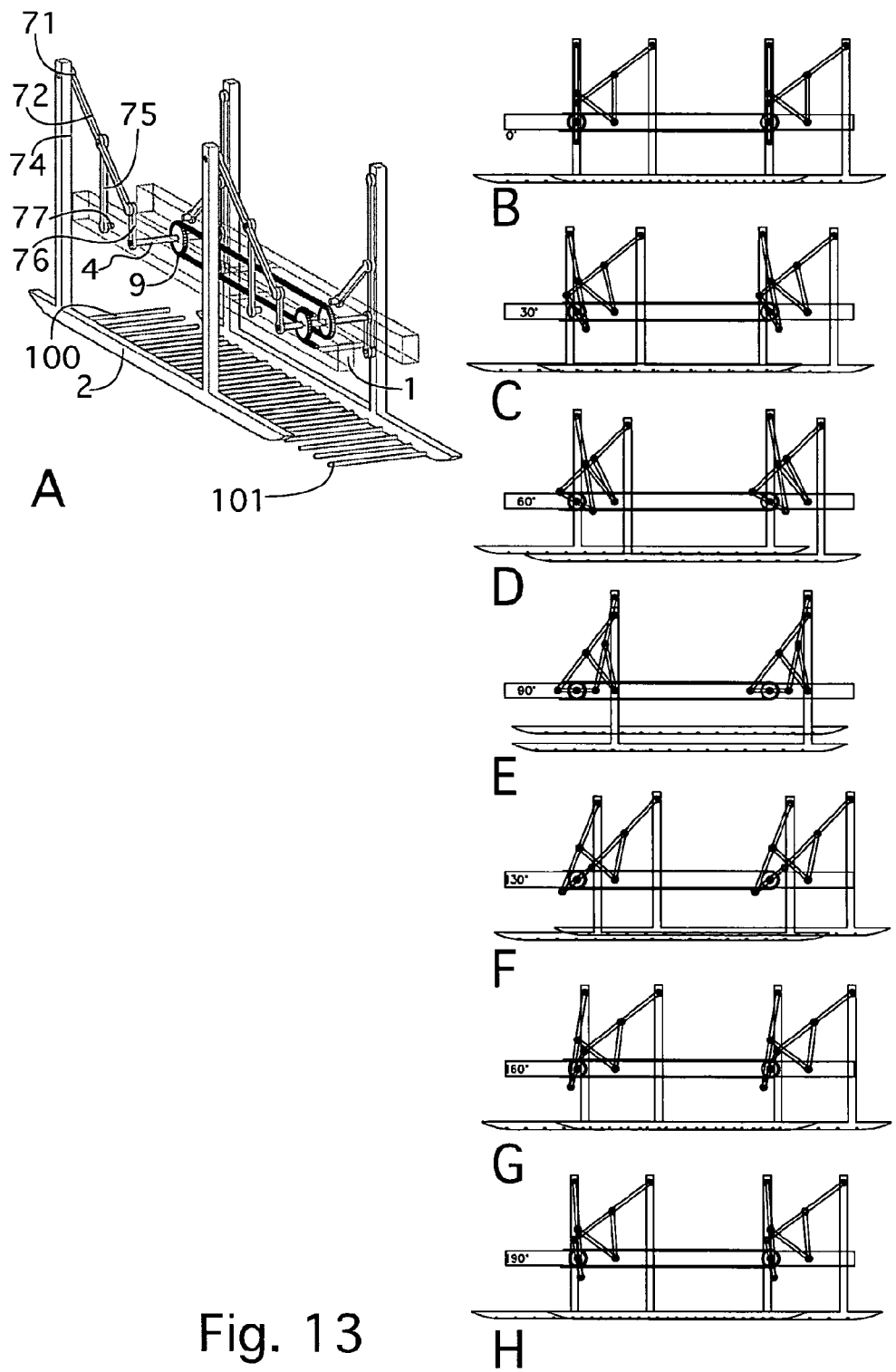

FIG. 13 shows a perspective view and front view of eight schematic representations of the preferred embodiment of FIG. 12.

Figure 14:
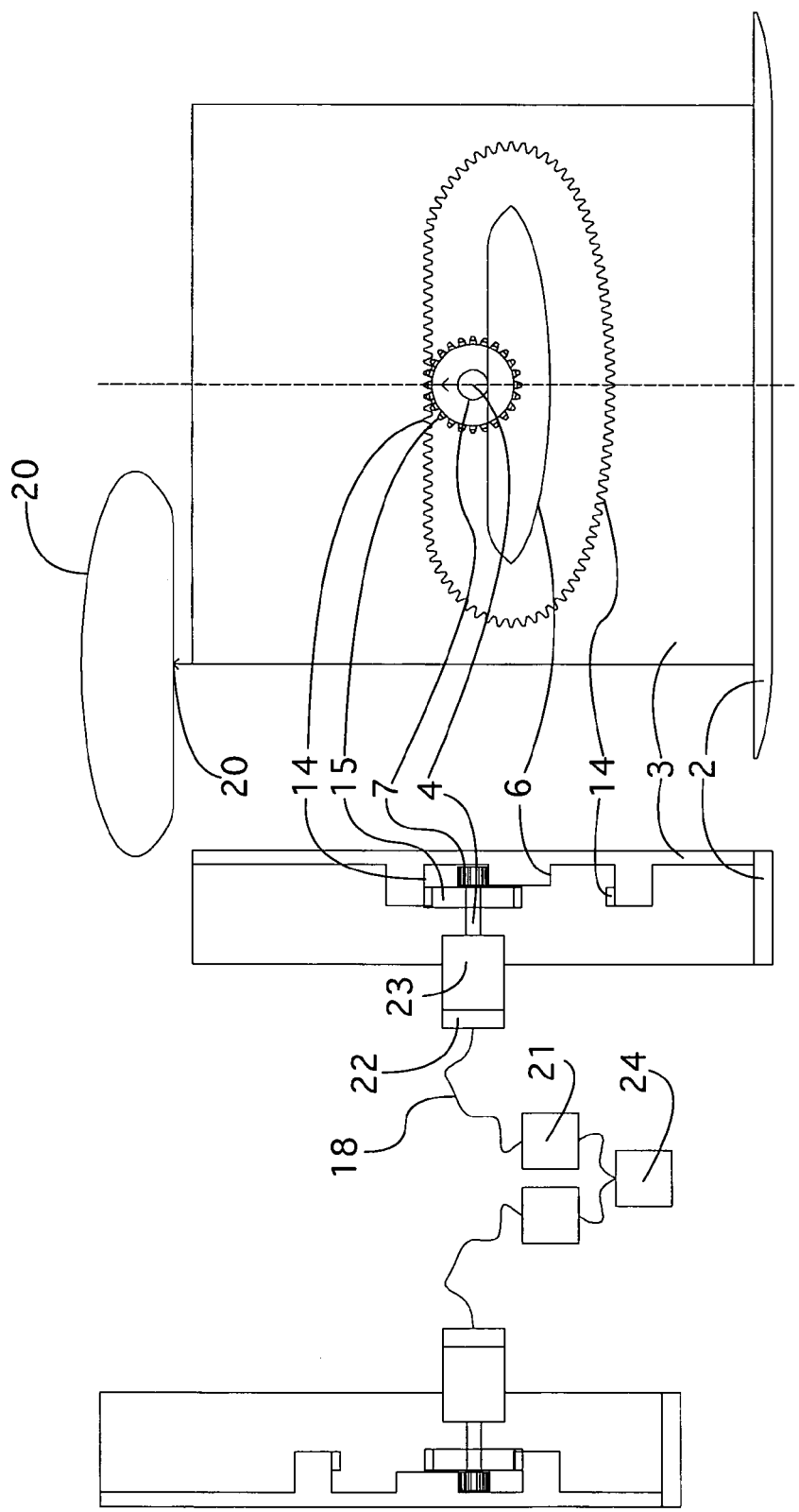

FIG. 14 shows schematic views of a further preferred embodiment according to the present invention.

Figure 15:
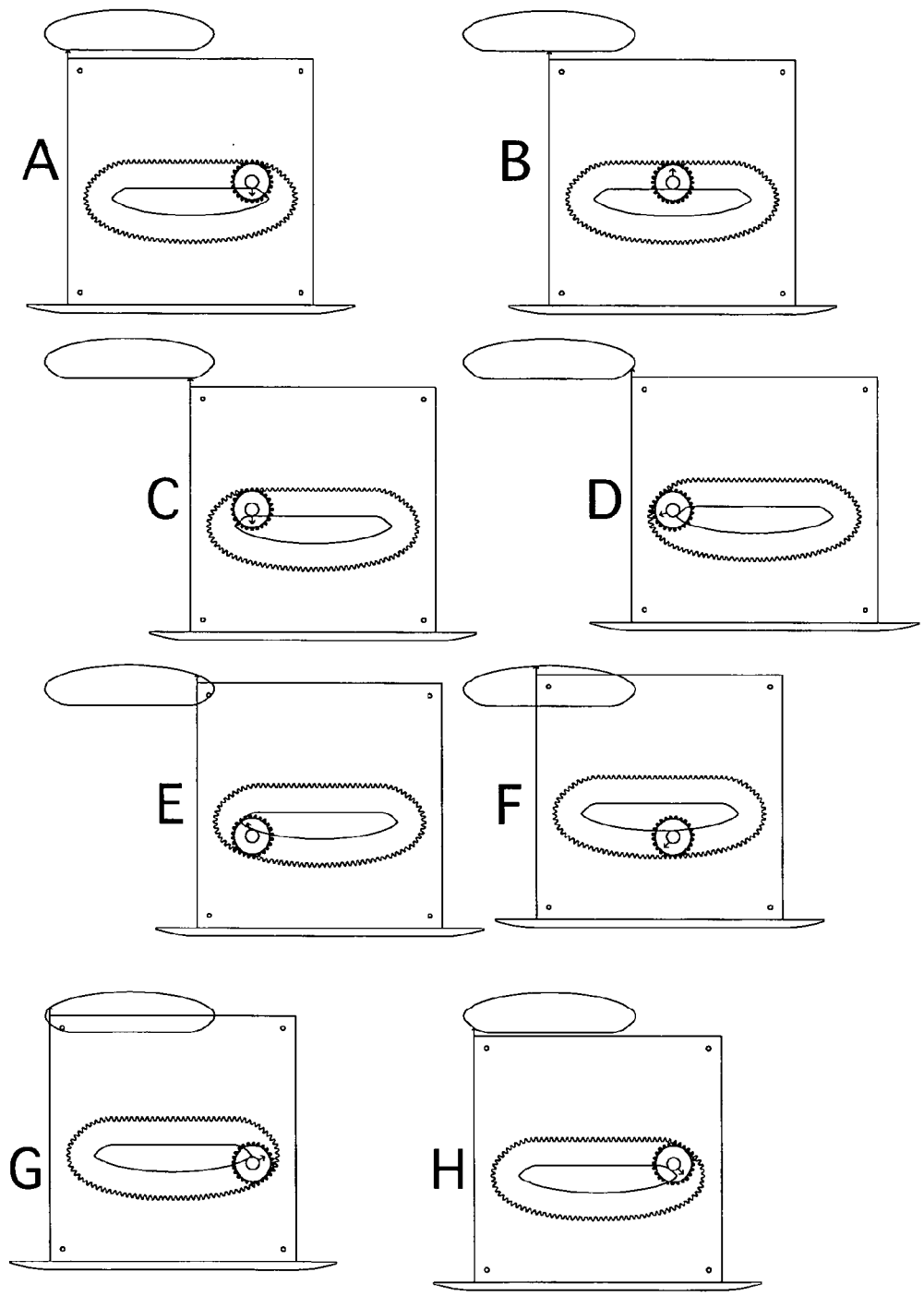

FIG. 15 shows eight schematic views of the embodiment of FIG. 14 in different operating positions of an operational cycle.

Figure 16:
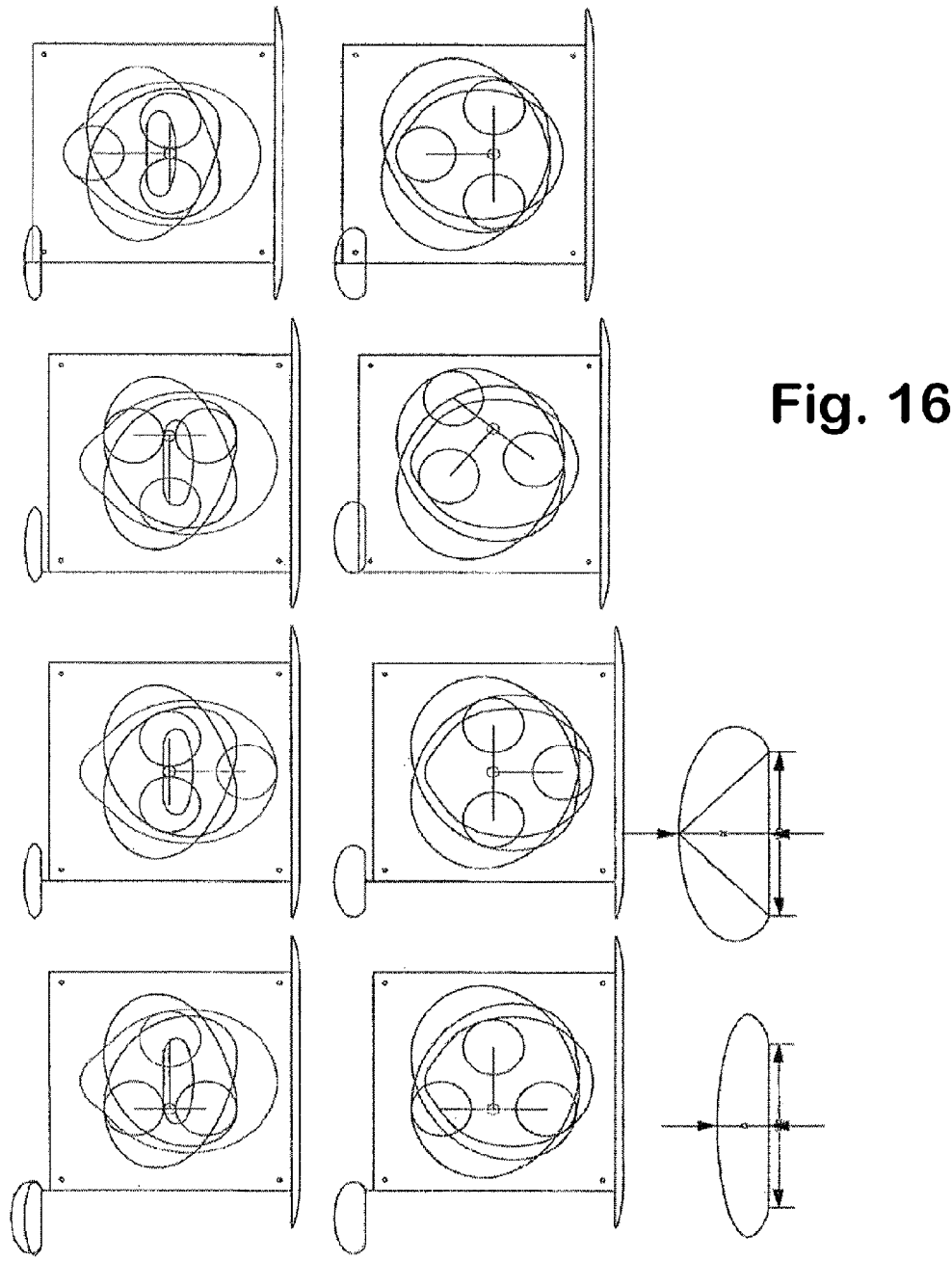
Figure 18A:
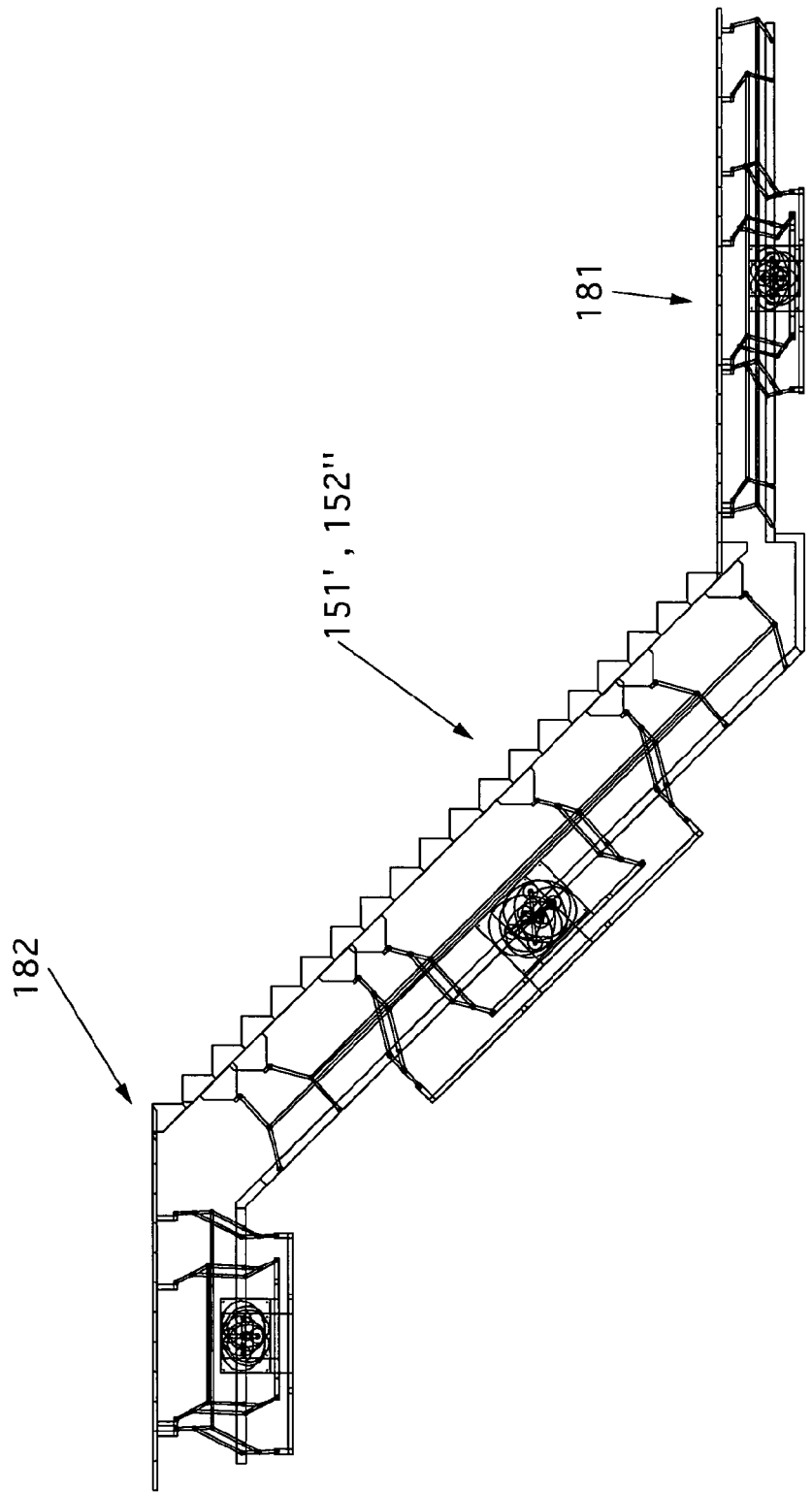
Figure 18B:
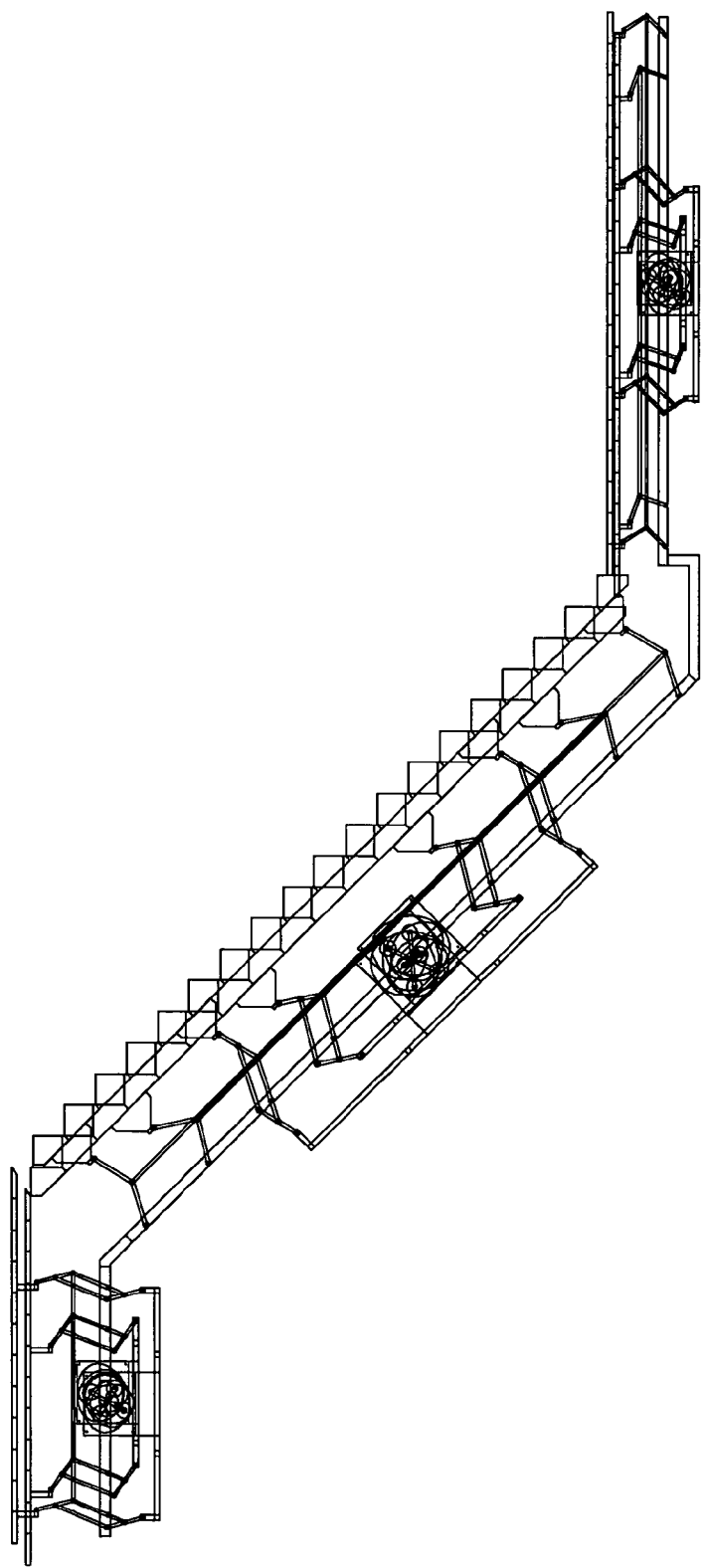
Figure 18C:
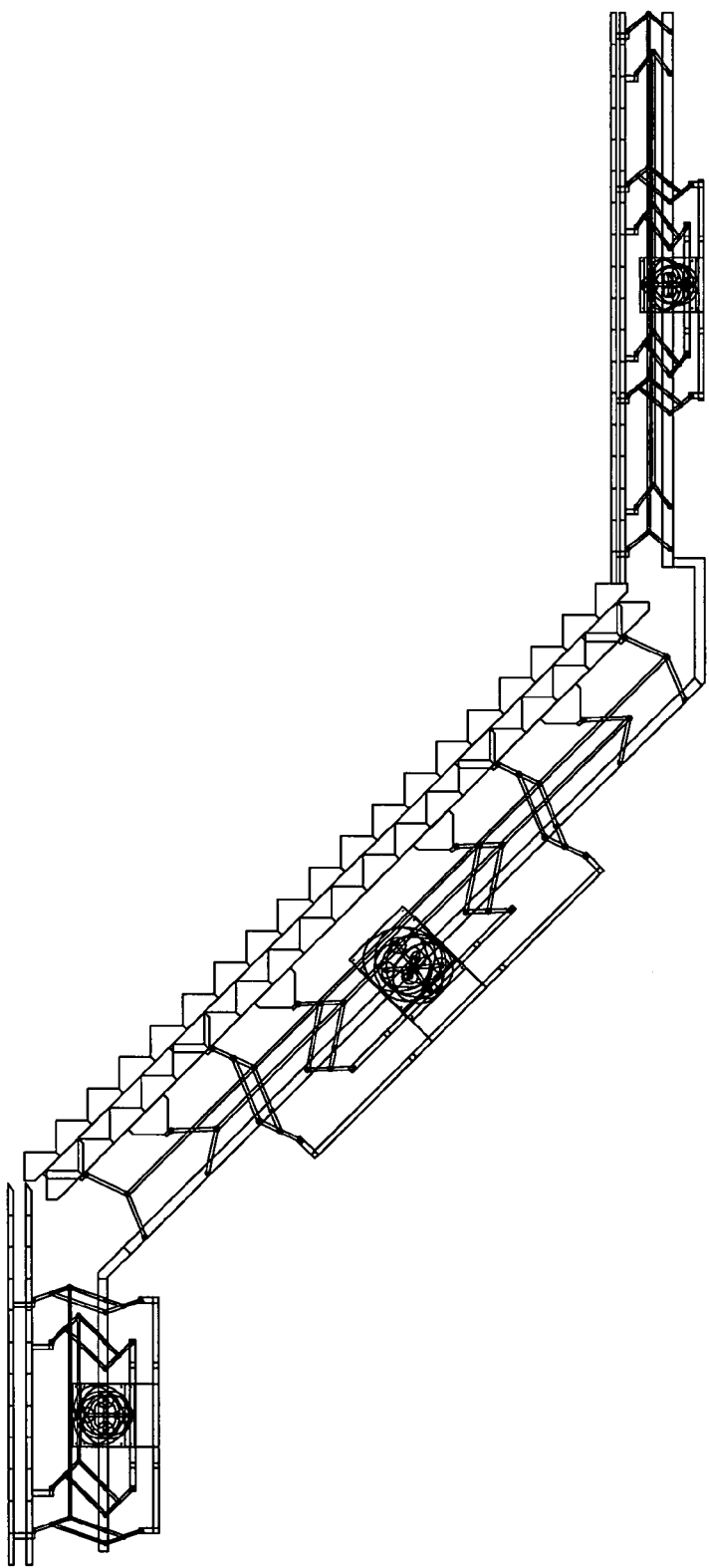
Figure 18D:
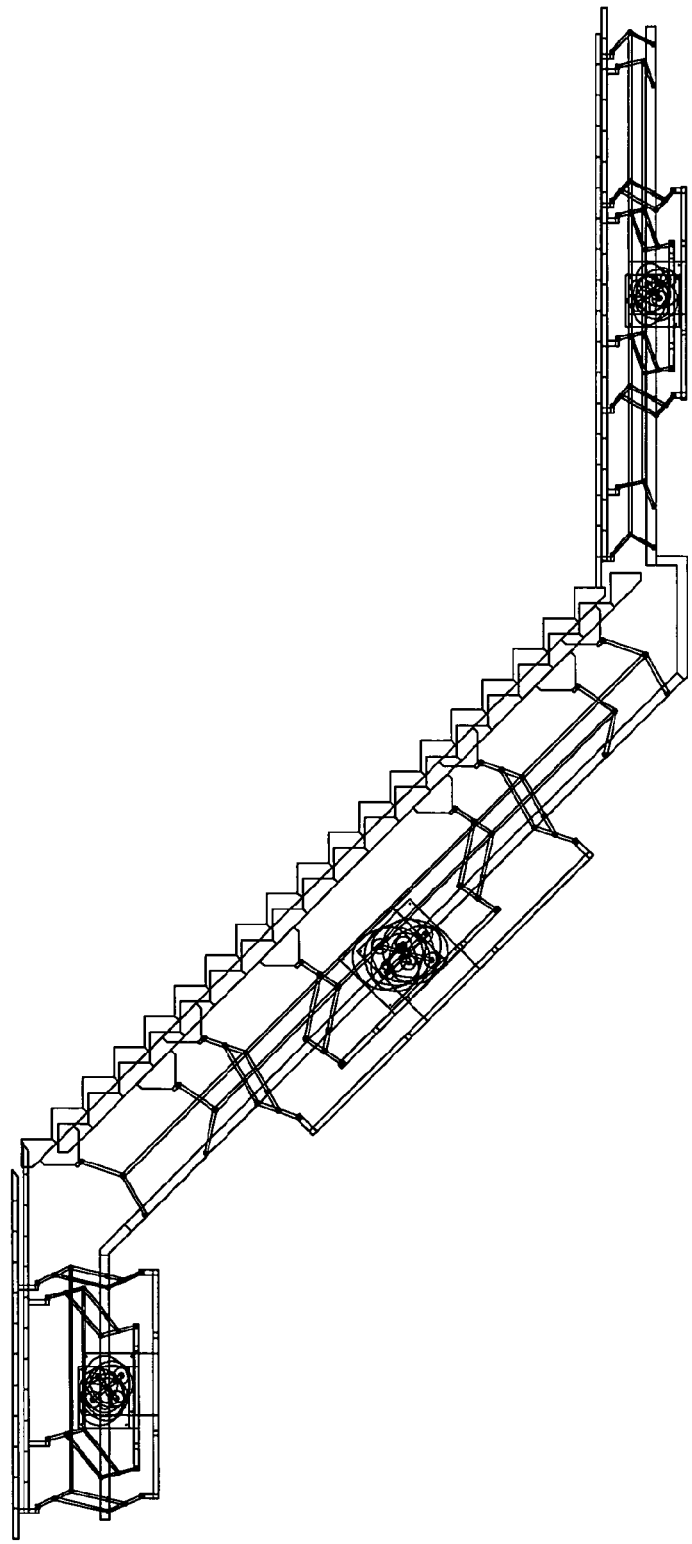

FIG. 16 shows eight schematic views of a further preferred embodiment in different operating positions of an operational cycle.

FIG. 17 shows eight schematic views of a further preferred embodiment based on the preferred embodiment of FIG. 16 in corresponding operating positions of the operational cycle.

FIG. 18 shows four schematic views of a further preferred embodiment according to the present invention.

Figure 19A:
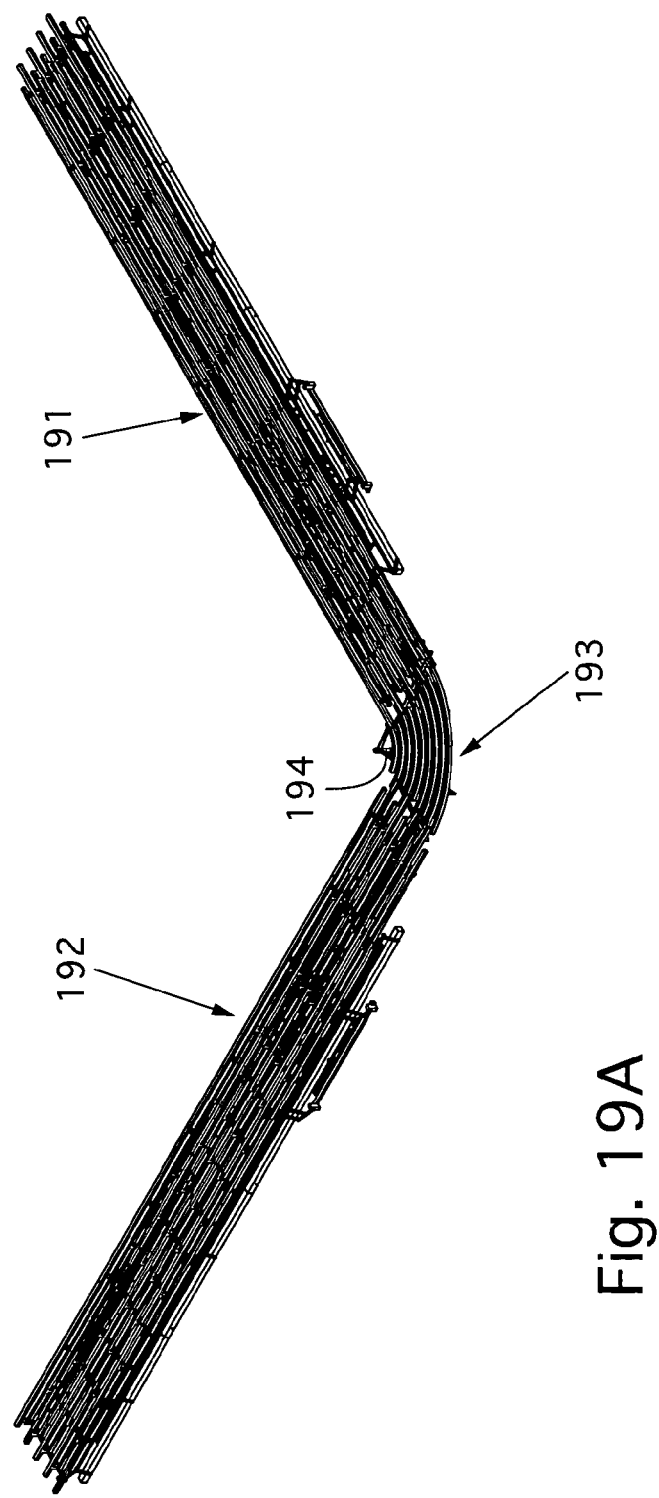
Figure 19B:
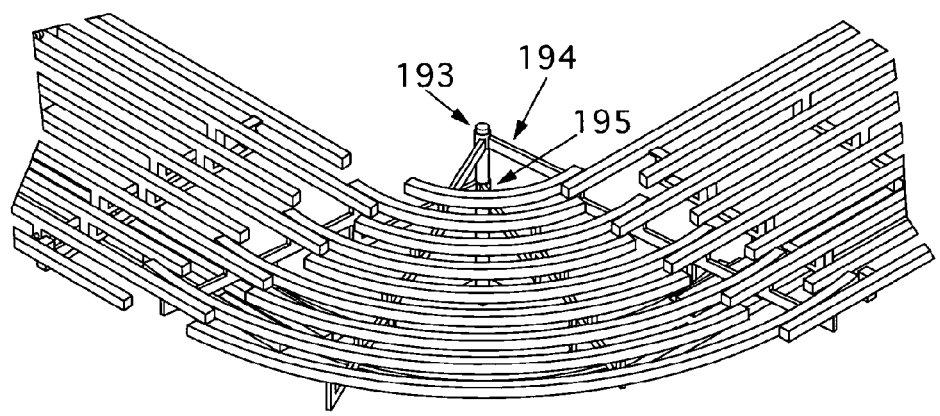

FIG. 19 shows two schematic views of a further preferred embodiment according to the present invention.

Different preferred embodiments are described in the figures. The numerals referring to similar components in different embodiments are as far as possible the same. Components which differ to some extent may therefore be designated with the same reference numerals in order to indicate an association of similarity.

A first preferred embodiment (FIG. 1) according to the present invention relates to a drive assembly. This comprises a frame 1 and drive member 2, also referred to as a girder 2. Mounted on drive member 2 is a movement control assembly 3 for moving drive member 2 along a path of movement relative to a drive shaft 4 of frame 1.

In other words, a drive shaft 4 is arranged in frame 1. Drive shaft 4 is mounted in a bearing and is rotatable. Drive shaft 4 is driven by means of a motor (see FIG. 4). Three arms 5, 11, 12 are arranged fixed to drive shaft 4. These arms 5, 11, 12 rotate with shaft 4. A support wheel is mounted rotatably on the end of each arm. Arm 5 has support wheel 7. Arm 11 has support wheel 15. Arm 12 has support wheel 16. The application of support wheels as described here is optional and with correct use provides the advantage of reduced wear and/or improved friction properties.

Each of the arms is arranged at a different position relative to the longitudinal direction of drive shaft 4. The arms hereby each rotate in their own plane. The plane of an arm corresponds to the plane of a corresponding guide track 13, 14, 25. A guide track is formed by cutting a shape from a plate. Such a plate can be manufactured from wood, but also from metal or any other suitable or wear-resistant material. A guide track can be directed inward as well as outward. An example of an outward directed guide track is guide track 6 according to FIG. 2. Examples of inward directed guide tracks are the guide tracks 13, 25, 14.

As shown in FIG. 3, support wheel 16 is situated inside the inner surface of guide track 25; support wheel 15 is situated in the inner surface of guide track 14 and support wheel 7 is situated inside the inner surface of guide track 13 and outside the outer surface of guide track 6. The plates forming the guide tracks are mutually fixed by means of bolts 26. In the embodiment of FIG. 2 the bolts 26 have the same function.

The operation of this entity is as follows. When the shaft rotates, the arms will co-rotate. The rotatably arranged wheels 7, 15, 16 will likewise co-rotate with the arms. Owing to the form of the guide tracks the whole movement control assembly 3 will be forced to move by the rotation of the shaft by the wheels. Since drive member 2 is mounted on movement control assembly 3, drive member 2 is hereby forced to co-displace. The form of the guide tracks and the relative orientation of the guide tracks and the relative orientation of the wheels determine the path of movement along which the movement control assembly and the drive member will move.

It is an object of the present invention to provide a pattern of forward movement. Said relative orientation of the wheels and the form of the guide tracks is therefore such that a part of the path of movement will form a horizontal straight line and the rest of the path of movement a curve connecting to the straight line for the purpose of enabling continuous implementation of the pattern of forward movement.

The form of the resulting path of movement is designated with the reference numeral 20. The horizontal straight line representing the forward displacement is designated with A.

Figure 4:
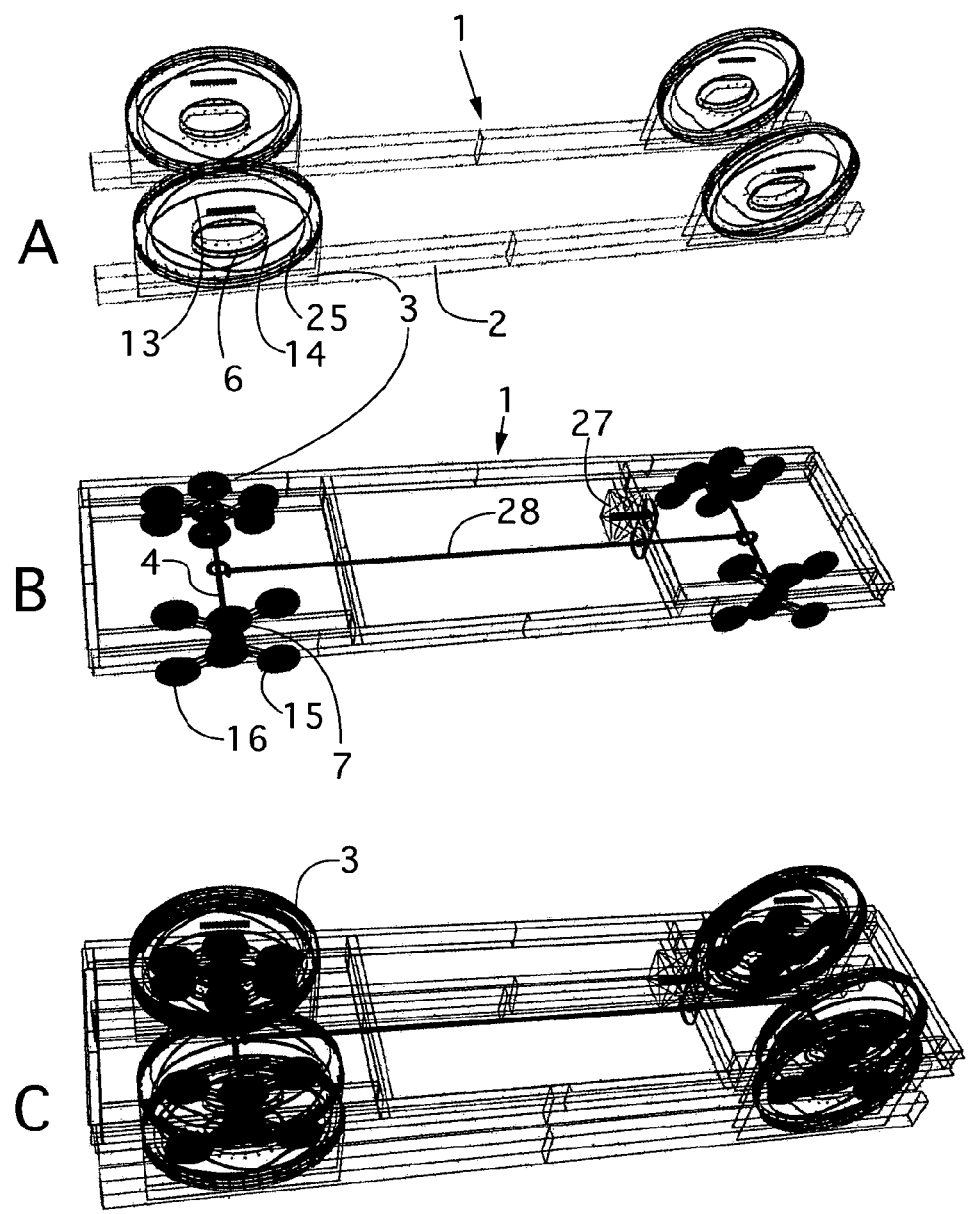
Figure 4:
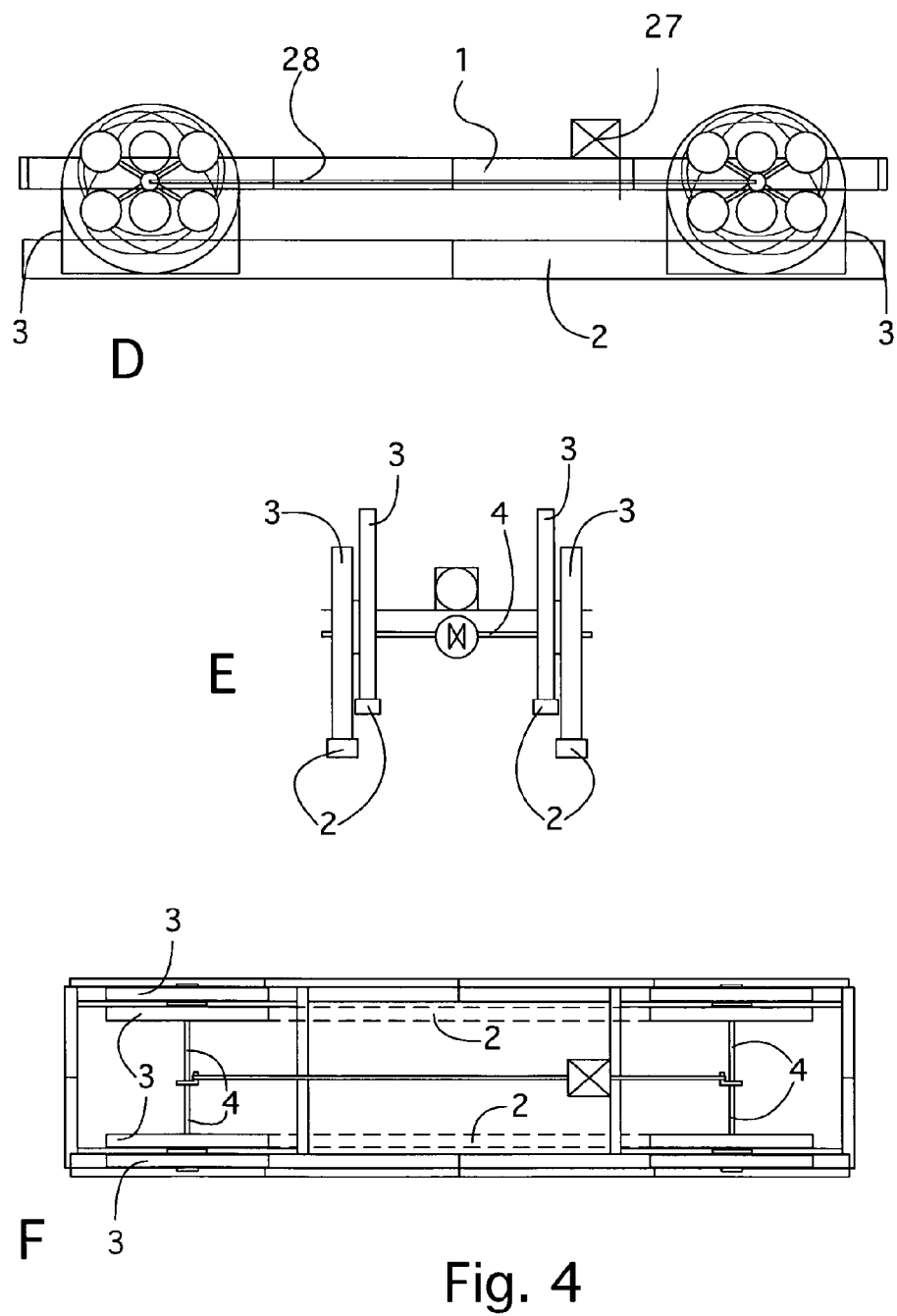

FIG. 4 shows six schematic views of vehicles provided with a drive by means of drive assemblies with movement control assemblies as described in the foregoing. The underside of the movement control assemblies is always mounted on the "feet" 2 of the vehicle, in other words the drive assemblies 2. Drive shaft 4 of the movement control assembly is coupled to frame 1 of the vehicle. A motor 27 arranged on the frame serves to drive the drive shaft. Using such an arrangement the movement control assembly according to the above described preferred embodiments can be applied to drive a vehicle. Alternative vehicles and devices which can be driven are likewise described herein-below. Different aspects of such a vehicle are shown in different part-figures of FIG. 4.

Because shaft 4 is fixed relative to the arms and the wheels, a driving of the device is realized, this driving following the resultant of the movement of the wheels along the curved paths in the movement control assembly.

FIG. 4A shows schematically two drive members 2 with eight movement control assemblies 3 arranged thereon. Each of the movement control assemblies has a structure as specified in the foregoing figures.

FIG. 4b shows how wheels 7, 16, 15 of arms 5, 12, 11 in the movement control assemblies are arranged in this entity. There is here a dual embodiment of the movement control assemblies and the associated wheels (as shown in top view in FIG. 4F) and the arrangement thereof in frame 1. The reason for this is that two drive members (feet) are arranged on both sides of the vehicle so that both sides of the vehicle are constantly supported by a drive member moving along the straight line (see FIG. 4E). Shown is that the frame is provided with a motor 27 which drives the transverse drive shafts 4. These drive shafts 4 are the same as those in earlier figures.

FIG. 4C shows the components of FIGS. 4A and 4B combined. These components are shown separately in FIGS. 4A and B for the sake of clarity. FIG. 4C shows the vehicle in the respective view. FIGS. 4D, E and F show this vehicle respectively in side view, front view and top view.

Hereby shown is that each foot of the vehicle is connected to the frame by means of two movement control assemblies. The vehicle comprises four feet, one on each longitudinal side. Both feet on the left-hand side and the right-hand side move substantially in opposite phase. At least one foot on each side always begins on the ground surface. The foot situated on the ground surface moves in one direction relative to the movement control assembly, preferably in a linear uniform movement. This movement corresponds to the straight line A shown as part of the path of movement in FIG. 1-3.

The other foot makes the return movement 20 connecting the ends of the straight line A. The combination of the movements of the feet on each side of the vehicle makes it appear that the vehicle is walking relative to the ground surface. The frame is hereby moved forward relative to the ground surface.

FIG. 4 shows a vehicle wherein on the underside of the frame a drive member (a foot) supports on the ground surface. Shown in FIG. 5 is a conveyor wherein the drive members (the feet) are directed upward and support forward moving products while the conveyor is in stationary position.

In FIG. 4 two movement control assemblies are applied per foot up to a total of eight for the vehicle. A fully supported and driven embodiment is hereby provided. A further provision is to always arrange two movement control assemblies (one for each foot) on both sides of the device with a set of rods for adjusting the orientation in lengthwise direction per drive assembly and movement control assembly relative to the frame.

Described with reference to FIG. 5 is an embodiment in which fewer movement control assemblies are required. In contrast to the embodiment of FIG. 4, an elongate vehicle or a conveyor can be driven with two movement control assemblies 3 by applying the resultant movement of a movement control assembly per simultaneously moving feet.

In the embodiment of FIG. 4 eight movement control assemblies 3 are applied in this example in order to drive and keep the vehicle balanced on both left and right as well as the front and rear. The purpose here is to keep the relative orientation, preferably the relative angle, the same during a whole drive cycle. In the embodiment of FIG. 5 this is possible by applying only two movement control assemblies 3. This is realized in the lengthwise direction by transmitting the orientation in the lengthwise direction of the feet by means of a transmission member 34, 35 always oriented in the lengthwise direction. This is realized in the width direction of the vehicle by transmitting the orientation from the foot provided with a movement control assembly on one side of the vehicle to the correspondingly moving foot on the other side of the vehicle with transmission shafts 40. The result is that the four feet have the same pattern of movement as in an embodiment similar to that of FIG. 4 with eight movement control assemblies.

FIG. 5 shows three views of the conveyor. A further difference from the embodiment of FIG. 4 is that a counterweight construction with counterweight 54 is shown with a drive member on the upper side and a drive member on the underside. In addition to the transmission from the front side to the rear side of the vehicle, this embodiment is suitable for enlarging the movement of one of the drive members relative to the movement of the other drive members driven with the same movement control assembly.

The transmission is realized with the rod construction by means of rods 33, 36, 37, 38 which are mounted pivotally to each other. Rods 33 are also coupled to a drive member by means of bearing 42, and rods 36 to drive members 32 by means of bearing 45. Rods 38 are connected to the frame by means of bearings 41.

In a manner understandable in the light of this description with normal knowledge of mechanical engineering a drive member 2 driven relative to the frame by means of movement control assembly 3 can be set into motion relative to the frame, as explained for instance in the foregoing. The whole drive member 2 remains constantly substantially parallel to frame 1 by means of the rod construction.

Drive member 2 runs here through a path of movement. Drive member 32 will pass through the path of movement which makes a longer 'stroke' than drive member 2 because of the longer arms with which drive member 32 is coupled to frame 1. This longer stroke results in a greater transport step than the regular step of foot 2. A difference between the embodiments of FIGS. 4 and 5 is therefore that FIG. 5 has these feet 32 as addition. The shown larger stroke (step) can hereby be provided with a movement control assembly of the same dimensions as in the embodiment of FIG. 4. Counterweights 54 are provided in order to impart a greater stability.

Where separate movement control assemblies 3 were required for the drive on the left and right in FIG. 4, due to the transverse drive assemblies 40 only one side is required. These each comprise two, preferably coaxial tubes for fixation, and thereby driving, between the side with the movement control assembly and the other side. The coaxial outer side is connected to rod 33 and the coaxial inner side is connected to arm 38, which are likewise fixed at the other side to the corresponding arms.

Tubes 40 are mounted at the pivot points 42 and ensure that the left and right-hand side do not rotate relative to the corresponding other side, and make it possible that the identical movement necessary on both sides to keep the vehicle balanced is brought about by a movement control assembly, wherein this movement is transmitted to the other side. Situated on the other side is a similar rod construction for transferring the movement of drive rods 40 to the corresponding drive members on the other side.

There is a difference in form provided between feet 2 and feet 2'. Foot 2 moves inside the path of foot 2'. This prevents a mutual collision when the movement cycles are performed. The pivot points on the rod construction are situated at corresponding positions, in the case of foot 2 directly on the construction beam and in the case of foot 2' on an elevated support. A similar construction with elevated support 47' is situated on foot 32'.

FIGS. 7, 8, 9 and 10 show schematically different predeterminable forms of relative orientations of wheels and guide tracks in different positions of the cycle of the movement control assemblies. As shown, each of these variants provides for a displacement of the underside of the drive member relative to the drive shaft. The position of the movement relative to the desired curve is shown in each case in the top left corner. FIG. 7 is a view of the variant according to FIG. 2, shown in a plurality of steps in the cycle.

The variant of FIG. 8 is the simplest construction realized on the basis of tests. The variant of FIG. 9 functions with outward directed guide tracks. The wheels move herein on the outer side of the guide track. In the variant of FIG. 10 the guide tracks are fixed on drive shaft 4 and the wheels are mounted on the housing of the movement control assembly. This demonstrates the reversibility of the principle.

It can clearly be seen on the basis of these figures how the form of the guide tracks and the relative orientation of the wheels result in the height of the guide tracks varying relative to the central shaft. Using this variation the skilled person can determine and realize, within the concept of the present invention, a specific pattern of movement with a desired path.

FIG. 11 shows a preferred embodiment with which it is possible to steer the device. Instead of an elongate frame 1 as according to previous figures, the device is provided with two circular frames 81, 82, each comprising two circular subframes 83, 84. Two movement control assemblies 3 are arranged on both frames, the movement control assemblies being coupled by means of shaft 4 to frame 1. The horizontal shaft 4 is driven by means of drive compartment 8 connected to a motor which is coupled to frame 1. A bodywork or for instance a seat can be arranged on frame 1.

The device has six feet, three of which are mounted on one circular frame and three on the other. The circular frames can be moved relative to each other relative to frame 1 by two movement control assemblies. It is hereby possible for the device to be displaced stepwise in its entirety in that three feet at a time are lifted along the return path of the respective movement control assembly, while the other three feet make a uniform horizontal movement known from the foregoing relative to the central frame due to the other movement control assembly. The two movement control assemblies function here in similar manner as in the embodiments according to FIGS. 4 and 5.

The steering function is realized in that each circular frame 2 comprises rings bearing-mounted relative to each other, in each case a lower ring and an upper ring. The large circular frame comprises upper ring 83 and lower ring 81. The small circular frame comprises lower ring 81 and upper ring 84. In this example there is a lower and an upper ring. The significance for the operation is the movement relative to the rings. The mutual arrangement is also possible in alternative manner as an inner and an outer ring or further alternative methods within the understanding of the skilled person.

Feet 79, 80 of the vehicle are connected in each case to the upper ring of the respective sub-frame, while the movement control assemblies are connected in each case to the lower ring of the respective sub-frame. This arrangement makes it possible to rotate the feet relative to the movement control assemblies, and thereby relative to frame 1. Such a rotation movement is possible when the feet are situated in a position raised from the ground. In terms of the movement control assemblies this means that the rotation movement can be performed when the movement control assemblies are arranged in/are moving in the return path, along which return path the feet of the one sub-frame are raised while the feet of the other sub-frame make the uniform movement on the basis of which the vehicle is displaced. Owing to the relative rotatability of the lower sub-frames and the upper sub-frames the vehicle can be steered in all directions by displacing the orientation of the feet in the raised position thereof relative to the feet situated on the ground.

Two mutually adjacent feet 79, 80 are preferably connected relative to each other by means of a rod construction 121 with ball joints. This rod construction serves to achieve that the feet cannot rotate relative to each other. This means in other words that the feet can move away from and toward each other but cannot rotate relative to each other.

This feature is shown most clearly in FIG. 11C. A horizontal rod 68 is connected via a hinge and a short connecting rod to different positions of the respective feet. The pivotability of the connecting rods with the horizontal rod 68 achieves that in the lengthwise direction the upright feet are arranged critical relative to each other.

The movement control assemblies are connected in similar manner to frame 1 by means of a rod and hinge construction 120. The purpose hereof is to prevent a change in angle between the frame and the movement control assemblies and to thereby hold them substantially parallel. The construction 120 in other words achieves that the frame remains stable or substantially in horizontal orientation relative to the ground. Similarly to the rod construction according to for instance FIG. 5, the connecting assemblies 120, 126 ensure that the mutual angle is maintained between the movement control assemblies and the frame. The connection by means of a hinge to the movement control assemblies and to elongate rods 34 coupled by means of the frame is realized in that the frame can be moved only in the direction of the guide tracks of the movement control assemblies.

FIG. 12 shows a spiral conveyor for upward and/or downward transport of for instance singulated products. The conveyor comprises two spiral-shaped carriers 112, 113, wherein carrier 112 is an inner spiral and carrier 113 an outer spiral. Both these spirals are provided in the mutually facing sides with carrier elements such as carrier fingers, also referred to as fingers.

The spiral-shaped elements are arranged relative to each other by means of two substantially coaxial tubular elements coupled on the top side to movement control assemblies 3. The outer spiral is connected to outer tube 123 by means of connecting elements 121. The inner spiral is connected to inner tube 124 by means of connecting elements 122. The outer tube has openings 126 for guiding connecting elements 122 therethrough.

The movement control assemblies are placed at a predetermined angle α relative to the horizontal in order to allow the uniform movement to progress upward or downward along this angle.

These fingers are placed at a mutual distance relative to each other. It is hereby possible for them to move both groupwise and individually along each other. An advantage of a group-wise arrangement is that horizontal carrier surfaces are defined for supporting products. The grouping is adjusted in accordance with the predetermined configuration of the guide tracks. It is hereby possible for the carrier fingers to carry the products by supporting them, while carrier fingers 114 of the inner spiral and carrier fingers 115 of the outer spiral can separately alternate carrying of the product. Because the spiral covers a path predetermined by the movement control assembly, preferably by setting two movement control assemblies relative to each other, it becomes possible to have the product carried separately by the fingers of the inner spiral and the outer spiral, whereby a transport path becomes possible.

The spiral conveyors impart the movement in the respective movement control assemblies 3 in a manner such that both spirals can move with the respective fingers in a cycle relative to each other so that the transport is realized as shown schematically in FIG. 12E-12N. The movement is provided for this purpose by a central drive shaft 28 which drives the two drive shafts 4 by means of a transmission. Owing to the transmission the shafts 4 rotate in substantially opposite direction to each other.

Shafts 4 function per movement control assembly in similar manner as the shaft 4 of the other embodiments by urging arms with support wheels along guide tracks, as described in the foregoing. Because a horizontal path is provided in the form of the path of movement, the movement is uniform in a transport path such that the product can be moved uniformly upward. In the return path the respective spiral element with the associated fingers is guided along the accelerated curve known from the foregoing.

The spiral conveyor according to the present invention is likewise provided as separate invention. The drive can be realized here by means of an alternative drive device not described per se in this text.

FIG. 13 shows an embodiment wherein the movement cycle is realized by the driven short arm 76. The device comprises a frame 1 in which a drivable rotatable shaft 4 is arranged in known manner. This shaft 4 drives the short arm 76. A drive rod 72 is connected in bearing-mounted manner to an end of this short arm 76. Drive rod 72 is mounted at the other outer end on an upper side of the gear rack element 73. An example of a functioning mutual ratio of the components is a length of the crank (76) to drive shaft=1, a distance of the shaft (4) to the shaft arm (75) on frame=2, a distance of the arm (75)=2.5, a length of the arm (72)=5 and a distance of the shaft to the arm (75) on arm (72)=2.5 (the centre of arm (72). Other variations can be determined experimentally within the concept of the present invention.

Also shown for this embodiment, similarly to FIG. 7-10, are multiple views of the progress of the pattern of movement during a movement cycle.

FIG. 14 relates to an embodiment wherein fewer guide tracks are provided in the movement control assembly. A part of the control for the purpose of the pattern of movement is realized by an electronic control. It is important here that the synchronization between the two movement control assemblies is very precisely adjusted. In the above preferred embodiments this mutual adjustment took place through the drive by means of a central drive shaft 4. In this preferred embodiment this operates due to an electronic control on the basis of a PLC 24 which controls two frequency controllers or servo drives 21 for synchronous control of motors 23 by means of an encoder 22. This ensures that the motors follow the path defined by gear rack 14 in synchronous manner. The gear rack serves here as an inward directed guide track. A free-running wheel bearing-mounted relative to shaft 4 also runs along the outward directed guide track 6. This free-running bearing-mounted wheel 7 rotates in opposite direction to shaft 4, while shaft 4 drives toothed wheel 15 and is fixed thereto. Because both sides of the device cover a similar guide track in the said synchronization, the resulting pattern of movement 20 of FIG. 14 is realized. Use is made here of the following synchronization data:

| step | rotation | step | rotation | step | rotation | step | rotation |
|---|---|---|---|---|---|---|---|
| 1 | 10 | 19 | 189.97 | 54 | 900.00 | 72 | 1080 |
| 2 | 20 | 20 | 200.33 | 53 | 890.03 | 71 | 1070 |
| 3 | 30 | 21 | 211.17 | 52 | 879.67 | 70 | 1060 |
| 4 | 40 | 22 | 222.78 | 51 | 868.83 | 69 | 1050 |
| 5 | 50 | 23 | 235.35 | 50 | 857.22 | 68 | 1040 |
| 6 | 60 | 24 | 249.06 | 49 | 844.65 | 67 | 1030 |
| 7 | 70 | 25 | 261.69 | 48 | 830.94 | 66 | 1020 |
| 8 | 80 | 26 | 272.34 | 47 | 818.31 | 65 | 1010 |
| 9 | 90 | 27 | 284.15 | 46 | 807.66 | 64 | 1000 |
| 10 | 100 | 28 | 298.15 | 45 | 795.85 | 63 | 990 |
| 11 | 110 | 29 | 316.47 | 44 | 781.85 | 62 | 980 |
| 12 | 120 | 30 | 338.99 | 43 | 763.53 | 61 | 970 |
| 13 | 130 | 31 | 365.47 | 42 | 741.01 | 60 | 960 |
| 14 | 140 | 32 | 395.52 | 41 | 714.53 | 59 | 950 |
| 15 | 150 | 33 | 428.86 | 40 | 684.48 | 58 | 940 |
| 16 | 160 | 34 | 464.21 | 39 | 651.14 | 57 | 930 |
| 17 | 170 | 35 | 501.44 | 38 | 615.79 | 56 | 920 |
| 18 | 180 | 36 | 540.00 | 37 | 578.56 | 55 | 910 |

It is the case here that a complete cycle is covered in fifty-two steps wherein the stated rotation is performed. The desired form of the pattern of movement 20 is hereby realized.

FIG. 15 provides eight views for the purpose of showing the form of the pattern of movement at different stages.

FIG. 16 shows two return characteristics of two preferred embodiments. The return characteristics of the upper four views provides a relatively small height, while the return characteristics of the lower four views provides a relatively high return. This return characteristic depend on the form of the guide tracks and the lengths of the arms applied. The lower return characteristics provide a so-called large stack height, whereby the embodiment of FIG. 17 is possible.

FIG. 17 shows further preferred embodiments with which a movable staircase is realized. Two stair-like elements, which can either be embodied with fingers similar to those of the embodiment of FIG. 12 or with carrier elements as shown in FIG. 5C, provide the option of a mechanical staircase. Two stair-forming elements 151, 152 are connected to each other here with movement control assembly 3. The stair-forming elements 151, 152 move relative to each other such that in side view the tops can move freely relative to each other. It hereby becomes possible for a person to stand on the upper side of a stair tread, which stair treads are moved upward, wherein the other element passes underneath, after which the subsequent tread of the other element approaches from the underside the treads on which the person is moving upward, after which the person is moved upward to the following tread height by the following element. The person is hereby moved upward a tread higher by alternately the stair-forming element 151 and the stair-forming elements 152. In this figure the arrangement of movement control assemblies 3 is shown about halfway along the stair-forming elements. It is however also possible to arrange these elements at the bottom side or at the top side of the staircase, whereby the system can be applied in advantageous manner subject to location.

The carrier elements of the different embodiments as shown in FIG. 5C, carrier elements 104, 105, in FIG. 12 such as the stated fingers 114, 115, in FIG. 13 fingers 100, 101 are, with appropriate structural modifications, mutually interchangeable in the different embodiments. A staircase according to the present invention can be applied per se as well as in combination with further embodiments. Such a staircase can be applied for both goods and people. Such a staircase can also be applied in a transport installation.

A movement control assembly according to the present invention can be applied as drive per se in the different preferred embodiments. Such a movement control assembly can however also be applied in many conceivable drivable systems. The devices driven by means of the movement control assembly according to the present description are also intended as separately definable invention independently of the movement control assembly. Such devices can also be driven here by means of drive systems other than a movement control assembly according to the present invention.

FIG. 18 shows four views of a moving staircase as variant of that in FIG. 17. Further shown are a feed conveyor 181 and a discharge conveyor 182. FIG. 19 shows two horizontal conveyors similar to that of FIG. 5. Further shown is a bend element 191, the supports of which are coupled alternately to feed conveyor 191 and discharge conveyor 192. Central shaft 193 imparts a pivoting action by means of connections 194, 195 to the respective support elements of the bend element.

The present invention has been described in the foregoing on the basis of several preferred embodiments. Different aspects of different embodiments are deemed described in combination with each other, wherein all combinations which can be deemed by a skilled person in the field as falling within the scope of the invention on the basis of reading of this document are included. These preferred embodiments are not limitative for the scope of protection of this document. The rights sought are defined in the appended claims.

The invention claimed is:

1. A drive assembly for providing a drive for application in a device such as a vehicle, or an advancing device such as a conveyor, wherein the drive assembly comprises:
   a frame;
   a motor fixed relative to the frame for the purpose of driving the drive assembly;
   at least two drive members for providing a transmission interface between the drive assembly and a ground surface or a conveyor for driving; and
   at least one movement control assembly per drive member, the movement control assembly being connected to the motor and at least one drive member, for providing a movement control of the respective drive member relative to the frame;
wherein
   the movement control assembly is suitable for imparting a path of movement to a coupled drive member, the path of movement comprising a closed cycle, which closed cycle is a resultant of at least two guide tracks comprised by the movement control assembly;
   the path of movement comprises a drive path and a return path wherein the return path does not cross the drive path, with the path of movement a linear movement along the drive path and a curved movement along the return path; and
   the drive members provide alternating drive contact.

2. The drive assembly as claimed in claim 1, wherein the movement control assembly comprises at least three guide tracks for providing the path of movement in co-action with respective guide arms fixed relative to each other, each preferably comprising a rotatable support element arranged on ends of the guide arms and the guide tracks.

3. The drive assembly as claimed in claim 2, wherein the guide tracks are each formed by means of being cut out of a plate element, and an assembly of guide tracks is formed by means of respective plate elements fixed to each other, wherein the guide arms are fixed relative to each other such that each guide arm is oriented movably within substantially the plane of the plate element.

4. The drive assembly as claimed in claim 1, wherein the drive member makes a substantially uniform linear movement along the drive path, the drive path being a resultant of the operation of the movement control assembly.

5. The drive assembly as claimed in claim 1, wherein the movement control assembly is fixed relative to the drive member.

6. The drive assembly as claimed in claim 1, wherein the drive member forms a drive foot for a vehicle.

7. The drive assembly as claimed in claim 1, wherein the drive members provide a drive for a conveyor by means of alternating engagement on the conveyor.

8. The drive assembly as claimed in claim 1, further comprising a drive gear rack in driving connection with a drive shaft of the motor, wherein the drive gear rack is preferably arranged mounted on the movement control assembly.

9. The drive assembly as claimed in claim 1, further comprising a transmission assembly for transmitting the path of movement from a movement control assembly at a position of drive members to a further position of the drive member to which the movement control assembly is coupled and/or other drive members to which no movement control assembly is coupled.

10. The drive assembly as claimed in claim 9, wherein the transmission assembly is provided with parallelogram-mic construction elements, wherein different parallelo-grammic construction elements are mounted on the frame at a corresponding location of the parallelogram, and wherein the corner points of the parallelogram are provided with pivot points in a manner such that all mounting points of the parallelogrammic construction are held at the same angle to the frame in any orientation of the path of movement.

11. The drive assembly as claimed in claim 9, wherein the mounting of the parallelogram construction is eccentric relative to the frame so that the drive path on a first side is relatively long and on the other side relatively short.

12. The drive assembly as claimed in claim 9, wherein a drive member is arranged on a first side of the parallelogram construction and a counterweight corresponding to this drive member on the other side.

13. The drive assembly as claimed in claim 1, further comprising a steering device for changing the direction of the drive assembly.

14. The drive assembly as claimed in claim 13, further comprising steering frames for the purpose of thereby changing the angle of direction of the movement control assembly relative to the drive members.

15. The drive assembly as claimed in claim 13, wherein the steering frames comprise two sub-frames rotat-able relative to each other, which sub-frames are preferably circular in top view, and are more preferably arranged pairwise, more preferably arranged substantially coaxially and are in bearing-mounted orientation relative to each other.

16. The drive assembly as claimed in claim 13, wherein the frame comprises means for rotating a left-hand drive member and a right-hand drive member relative to the frame.

17. The drive assembly as claimed in claim 1, wherein the assembly preferably comprises a plurality of drive members, such as two drive members, more preferably four drive members and more preferably six drive members, wherein the drive members preferably have respectively a rod form, quadrant form, circular form or triangular form.

18. The drive assembly as claimed in claim 1, wherein the movement control assembly comprises:
 a drive shaft drivable by the motor,
 a rotation drive member rotationally fixed to the drive shaft for driving the movement control assembly, which preferably functions as an eccentric,
 a support member connected by means of a bearing to the rotation drive member for supporting a drive member, and
 a connecting member connected in bearing-mounted manner to the frame and the support member for imparting, together with the rotation drive member, a movement profile to the support member, wherein the mutual ratios of the distances between the connecting locations between respectively the frame, the rotation drive member, the support member and the connecting member provide a predetermined relative pattern of movement for the drive member.

19. A vehicle comprising a drive assembly as claimed in claim 1, comprising:
 coupling means for coupling the frame to a chassis and/or bodywork, wherein a number of drive members function as stepping members for the vehicle.

20. An advancing device, such as a conveyor, comprising a drive assembly as claimed in claim 1, comprising:
 coupling means for coupling the frame to a conveyor belt of the conveyor.

21. A spiral conveyor comprising a drive assembly according to claim 1 for cyclical movement relative to each other of two substantially spiral-shaped conveyor elements, each connected with a drive side to the drive assembly, wherein each spiral-shaped conveyor element comprises:
 a substantially spiral-shaped carrier member for carrying product carriers; and
 product carriers extending relative to the carrier member in the position of use such that they can carry products, wherein:
 the relative arrangement of the product carriers and the carrier members is such that a transport cycle relative to each other is possible with driving by the drive assembly for the purpose of providing an upward or downward transport along a substantially spiral-shaped path.

22. A method for providing a forward movement using a device as claimed in claim 1, comprising the steps of:
 providing the device; and
 providing the forward movement by means of the device.

* * * * *